(12) United States Patent
DiBenedetto et al.

(10) Patent No.: US 11,037,090 B2
(45) Date of Patent: *Jun. 15, 2021

(54) METHODS, SYSTEMS AND PROGRAM PRODUCTS FOR AGGREGATING AND PRESENTING SERVICE DATA FROM MULTIPLE SOURCES OVER A NETWORK

(71) Applicant: Bootler, LLC, Dover, DE (US)

(72) Inventors: Michael DiBenedetto, Chicago, IL (US); Liam Hession, Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/565,034

(22) Filed: Sep. 9, 2019

(65) Prior Publication Data

US 2020/0279209 A1    Sep. 3, 2020

Related U.S. Application Data

(63) Continuation of application No. 15/340,432, filed on Nov. 1, 2016, now Pat. No. 10,445,683.

(51) Int. Cl.

| | |
|---|---|
| *G06Q 30/02* | (2012.01) |
| *G06Q 10/08* | (2012.01) |
| *G06F 16/245* | (2019.01) |
| *G06F 16/22* | (2019.01) |
| *G06Q 50/12* | (2012.01) |

(52) U.S. Cl.
CPC ....... *G06Q 10/083* (2013.01); *G06F 16/2228* (2019.01); *G06F 16/245* (2019.01); *G06Q 50/12* (2013.01)

(58) Field of Classification Search
CPC ..... G06Q 30/02; G06Q 50/12; G06F 16/2228
USPC .......................................................... 705/15
See application file for complete search history.

(56) References Cited

U.S. PATENT DOCUMENTS

| | | |
|---|---|---|
| 5,850,214 A | 12/1998 | McNally et al. |
| 6,384,850 B1 | 5/2002 | McNally et al. |
| 6,871,325 B1 | 3/2005 | McNally et al. |

(Continued)

OTHER PUBLICATIONS

Barbajoo FAQ. https://web.archive.org/web/20151001191214/tttp://barbajoo.com:80/faq/faq Retrieved by archive.org Oct. 2015.

(Continued)

*Primary Examiner* — Luna Champagne
(74) *Attorney, Agent, or Firm* — Aronberg Goldgehn Davis and Garmisa

(57) ABSTRACT

A computer-implemented method for providing a searchable aggregated data structure for a networked application. Source data in a plurality of formats is acquired from delivery service computers associated with food or beverage delivery services over a communication network. Acquired source data includes, for each of the food or beverage delivery services, data representing multiple source menu items. Acquired source data is mapped according to a predetermined data format. Formatted data is linked to common sources of the source menu items based on identification data. Common menu items among the source menu items are identified, and, for each identified common menu item, the source menu items are associated with a master menu item. Linked data and master menu items are combined into a master data set. The master data set and the identification data are imported into the searchable aggregated data structure.

17 Claims, 16 Drawing Sheets

(56) References Cited

U.S. PATENT DOCUMENTS

| | | | |
|---|---|---|---|
| 6,982,733 | B1 | 1/2006 | McNally et al. |
| 7,431,650 | B2 | 10/2008 | Kessman et al. |
| 7,483,883 | B2 | 1/2009 | Barth et al. |
| 7,668,809 | B1 | 2/2010 | Kelly et al. |
| 7,668,811 | B2 | 2/2010 | Janssens et al. |
| 7,774,331 | B2 | 8/2010 | Barth et al. |
| 7,878,909 | B2 | 2/2011 | Kessman et al. |
| 8,095,536 | B1 | 1/2012 | Kelly et al. |
| 8,146,077 | B2 | 3/2012 | McNally et al. |
| 8,393,969 | B2 | 3/2013 | Kessman et al. |
| 8,458,162 | B2 | 6/2013 | Barth et al. |
| 8,566,137 | B1 | 10/2013 | Cabrera et al. |
| 8,600,784 | B1 | 12/2013 | Ivey et al. |
| 8,738,599 | B2 | 5/2014 | Barth et al. |
| 8,874,492 | B2 | 10/2014 | Zacharia et al. |
| 8,972,434 | B2 | 3/2015 | English et al. |
| 9,005,031 | B2 | 4/2015 | Kessman et al. |
| 9,009,060 | B2 | 4/2015 | McNally |
| 9,072,965 | B2 | 7/2015 | Kessman et al. |
| 9,165,556 | B1 | 10/2015 | Sugar et al. |
| 9,509,617 | B1 * | 11/2016 | Malmgren ............... H04L 67/10 |
| 9,754,331 | B1 | 9/2017 | Beckelman et al. |
| 2001/0034708 | A1 | 10/2001 | Walker et al. |
| 2002/0107747 | A1 * | 8/2002 | Gerogianni ........ G06Q 30/0619 |
| | | | 705/26.44 |
| 2004/0044578 | A1 | 3/2004 | Kim et al. |
| 2007/0225828 | A1 | 9/2007 | Huang et al. |
| 2009/0119183 | A1 | 5/2009 | Azimi et al. |
| 2009/0167553 | A1 | 7/2009 | Hong et al. |
| 2009/0171950 | A1 | 7/2009 | Lunenfeld |
| 2009/0271486 | A1 | 10/2009 | Ligh et al. |
| 2011/0105223 | A1 | 5/2011 | Kessman et al. |
| 2011/0302148 | A1 | 12/2011 | Kakade et al. |
| 2013/0013408 | A1 | 1/2013 | Hjelm et al. |
| 2013/0097054 | A1 | 4/2013 | Breitenbach et al. |
| 2013/0282516 | A1 | 10/2013 | McCartney et al. |
| 2013/0325641 | A1 | 12/2013 | Brown et al. |
| 2014/0221069 | A1 | 8/2014 | Kessman |
| 2014/0249937 | A1 | 9/2014 | McNally |
| 2014/0279093 | A1 | 9/2014 | McNally |
| 2015/0088695 | A1 | 3/2015 | Lorbiecki et al. |
| 2015/0220836 | A1 * | 8/2015 | Wilson .................... H04L 67/18 |
| | | | 706/46 |
| 2016/0063473 | A1 | 3/2016 | Lee |
| 2016/0104116 | A1 | 4/2016 | Greenberg et al. |
| 2016/0171584 | A1 | 6/2016 | Cao |
| 2016/0180440 | A1 | 6/2016 | DiBenedetto et al. |
| 2016/0188138 | A1 | 6/2016 | Chen et al. |
| 2017/0154073 | A1 | 6/2017 | Wu et al. |
| 2017/0192644 | A1 | 7/2017 | Francis et al. |
| 2017/0287086 | A1 | 10/2017 | Lopez et al. |
| 2017/0293950 | A1 | 10/2017 | Rathod |

OTHER PUBLICATIONS

"Danny Meyer-Backed Company Wants to Be the Kayak.com of Food Delivery", Written by Whitney Filloon. https://www.eater.com/2016/1/22/10814426/olo-dispatch-food-delivery-danny-meyer-funding Published Jan. 2016.

"Harvest Plans to Wrap All Your Food Delivery Into One Platform", Written by Susan Lahey. https://www.siliconhillsnews.com/2016/02/16/harvest-plans-to-wrap-all-your-food-delivery-into-one-plafform/ Published Feb. 2016.

"Childhood Friends Reunite and Launch a Kayak for Restaurant Delivery Services", Written by Brett Wistrom. https://www.americaninno.com/austin/austin-food-delivery-this-startup-aggregates-restaurant-delivery-services/. Published Nov. 2015.

\* cited by examiner

| data_source | booster_id | source_resto_id | name | tags | price_rating | order_minimum | sales_tax | delivery_fee |
|---|---|---|---|---|---|---|---|---|
| 5 | NULL | 2706 | 'La Zuerkis' | ['Ecuadorian'] | NULL | 0 | 10.5 | {"as_percentage": false, "fee": 599, "taxable": false} |
| 4 | NULL | 305977 | 'La Zuerkis' | ['Latin American', 'South American', 'Spanish'] | NULL | 880 | 11 | {"as_percentage": false, "fee": 300, "taxable": false} |
| 7 | 'E1825.fmg' | NULL | 'La Zuerkis' | ['Ecuadorian', 'Latin American', 'South American', 'Spanish'] | 2 | NULL | NULL | NULL |
| ⋮ | ⋮ | ⋮ | ⋮ | ⋮ | ⋮ | ⋮ | ⋮ | ⋮ |

FIG. 3

| data_source | master_item_id | source_item_id | item_name | section_name | item_price | source_item_ids | item_prices |
|---|---|---|---|---|---|---|---|
| 3 | NULL | '030187' | 'Hong Kong-Style Milk Coffee' | 'Beverages' | 449 | NULL | NULL |
| 4 | NULL | '974614' | 'Hong Kong-Style Coffee' | 'Drinks' | 499 | NULL | NULL |
| 1 | '9636943719c84ae77a86 a87' | NULL | 'Hong Kong-Style Coffee' | 'Drinks' | NULL | [null, null, null, null, '974614', '030187', null, null] | [null, 449, null, null, 499, 449, null, null] |
| ⋮ | ⋮ | ⋮ | ⋮ | ⋮ | ⋮ | ⋮ | ⋮ |

Subtotal (Without Delivery & Tax) $11.50

Please provide your age for alcohol

GHOODS — $1.71 X — 158

Menu Price: $11.50 — Time Est: 55-70 min — 164
Tax: $1.21 — Order Min: $20.00 — 166
Delivery Fee: $3.00 — Select — 168

160
162

CATERING — $16.54 X

Menu Price: $12.00 — Time Est: 45-60 min
Tax: $1.54 — Order Min: $15.00
Delivery Fee: $3.00 — Select

154

DEADFAST — $17.70 X

Menu Price: $11.50 — Time Est: 50-65 min
Tax: $1.21 — Order Min: $0.00
Delivery Fee: $4.99 — Select

DELIVeryM&Co — $14.91 X

Menu Price: $11.50 — Time Est: 45
Tax: $0.41 — Order Min: $15.00
Delivery Fee: $3.00 — Select

METHODS, SYSTEMS AND PROGRAM PRODUCTS FOR AGGREGATING AND PRESENTING SERVICE DATA FROM MULTIPLE SOURCES OVER A NETWORK

CROSS-REFERENCE AND RELATED APPLICATIONS

This application is a continuation application of and claims 35 USC § 120 priority to U.S. patent application Ser. No. 15/340,432 filed Nov. 1, 2016, which is incorporated herein by reference in its entirety. U.S. patent application Ser. No. 15/340,432 is related to commonly owned U.S. patent application Ser. No. 15/340,436, filed Nov. 1, 2016, and entitled METHODS, SYSTEMS AND PROGRAM PRODUCTS FOR AGGREGATING AND PRESENTING SERVICE DATA FROM MULTIPLE SOURCES OVER A NETWORK, and now U.S. Pat. No. 10,217,144, which is hereby incorporated by reference in its entirety.

FIELD

An example field of the invention is record linkage. Particular applications include master data management.

BACKGROUND OF THE INVENTION

For convenience and other benefits, it is useful to provide a customer with the ability to order services online for in-person delivery, such as to a customer's home or business. For example, it is well known in the art to provide an interactive application or website by which a customer can order food items (such as pizza) from a restaurant for delivery. For example, the user can enter a website operated by a particular restaurant, select one or more food items provided by that restaurant, and place an order for delivery.

More recently, food and beverage delivery services have been introduced separately from the restaurants to provide a customer with the ability to select online food and beverage items from among several restaurants for which the delivery service can deliver food and beverage items. To order a food or beverage item, the customer enters a website or application for a particular delivery service and selects from among the restaurants and then food or beverage items that are available through that particular delivery service. Upon completion of the customer's order, the delivery service acquires the selected food or beverage items from the restaurant and delivers the food or beverage items to the customer.

SUMMARY OF THE INVENTION

Example computer-implemented methods are provided for providing a searchable aggregated data structure for a networked application. In an example method, source data is acquired from a plurality of delivery service computers associated with a plurality of food or beverage delivery services over a communication network, the acquired source data being in a plurality of formats, where the acquired source data includes, for each of the plurality of food or beverage delivery services, data representing multiple source menu items. The acquired source data is mapped according to a predetermined data format to provide formatted data. The formatted data is linked to common sources of the menu items based on identification data such that at least one food or beverage delivery service is linked to each common source and its source menu items. Common menu items among the source menu items are identified in the formatted data, and, for each identified common menu item, the source menu items are associated with a master menu item. The linked data and the master menu items are combined into a master data set, and the master data set and the identification data are imported into the searchable aggregated data structure.

Example systems provide an interactive food or beverage ordering service accessible by a user computing device. Example systems include a data acquisition and processing module configured to acquire source data from a plurality of delivery service computers associated with a plurality of food or beverage delivery services and provide a master data set of formatted data, wherein the master data set includes, for each of the plurality of food or beverage delivery services, data representing multiple menu items linked to identification data uniquely identifying sources of the menu items delivered by the plurality of food or beverage delivery services; and a website database configured for receiving the most recent data from the master data set, the master data set representing the multiple menu items provided by the plurality of food or beverage delivery services.

Example apparatuses providing a searchable aggregated data structure for a networked application include a processor, a memory accessible by the processor, and a set of computer-readable instructions stored on a non-transitory medium and accessible by the processor. The instructions are executable by the processor to perform a method including acquiring source data from a plurality of delivery service computers associated with a plurality of food or beverage delivery services over a communication network, where the acquired source data being in a plurality of formats, and where the acquired source data includes, for each of the plurality of food or beverage delivery services, data representing multiple source menu items. The method further includes mapping the acquired source data according to a predetermined data format to provide formatted data, linking the formatted data to common sources of the source menu items represented by identification data such that at least one food or beverage delivery service is linked to each common source and its source menu items, identifying common menu items among the source menu items in the formatted data, and, for each identified common menu item, associating the source menu items with a master menu item, combining the linked data and the master menu items into a master data set, and importing the master data set and the identification identifier data into the searchable aggregated data structure.

BRIEF DESCRIPTION OF THE DRAWINGS

FIG. 3 shows a sample database table showing unconsolidated service data alongside consolidated master data according to an embodiment of the invention;

FIG. 4 shows a sample database table including source menu items alongside a combined master menu item, according to an embodiment of the invention;

Figure 11:
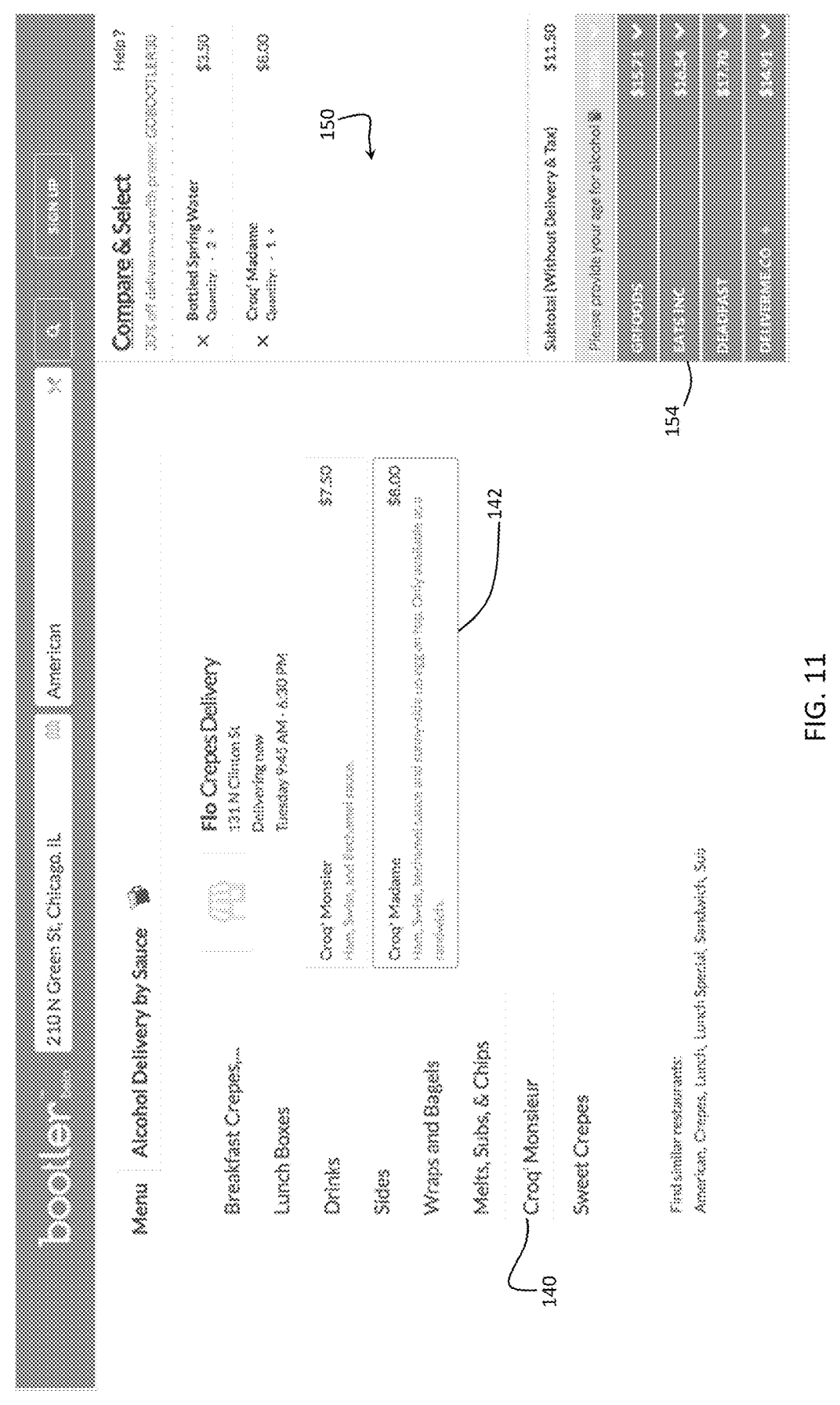

FIG. 11 shows an example screenshot of a menu page after a user has selected some menu items, including a price comparison frame depicting selected menu items in a cart and multiple delivery services capable of delivering the selected menu items;

FIG. 12 shows the price comparison frame of FIG. 11, enlarged and expanded;

FIG. 14 shows an example screenshot of a page showing the selected beverage, in which the selected beverage is added to an additional online shopping cart and a beverage delivery service is depicted along with food delivery services.

DETAILED DESCRIPTION

Figure 1:
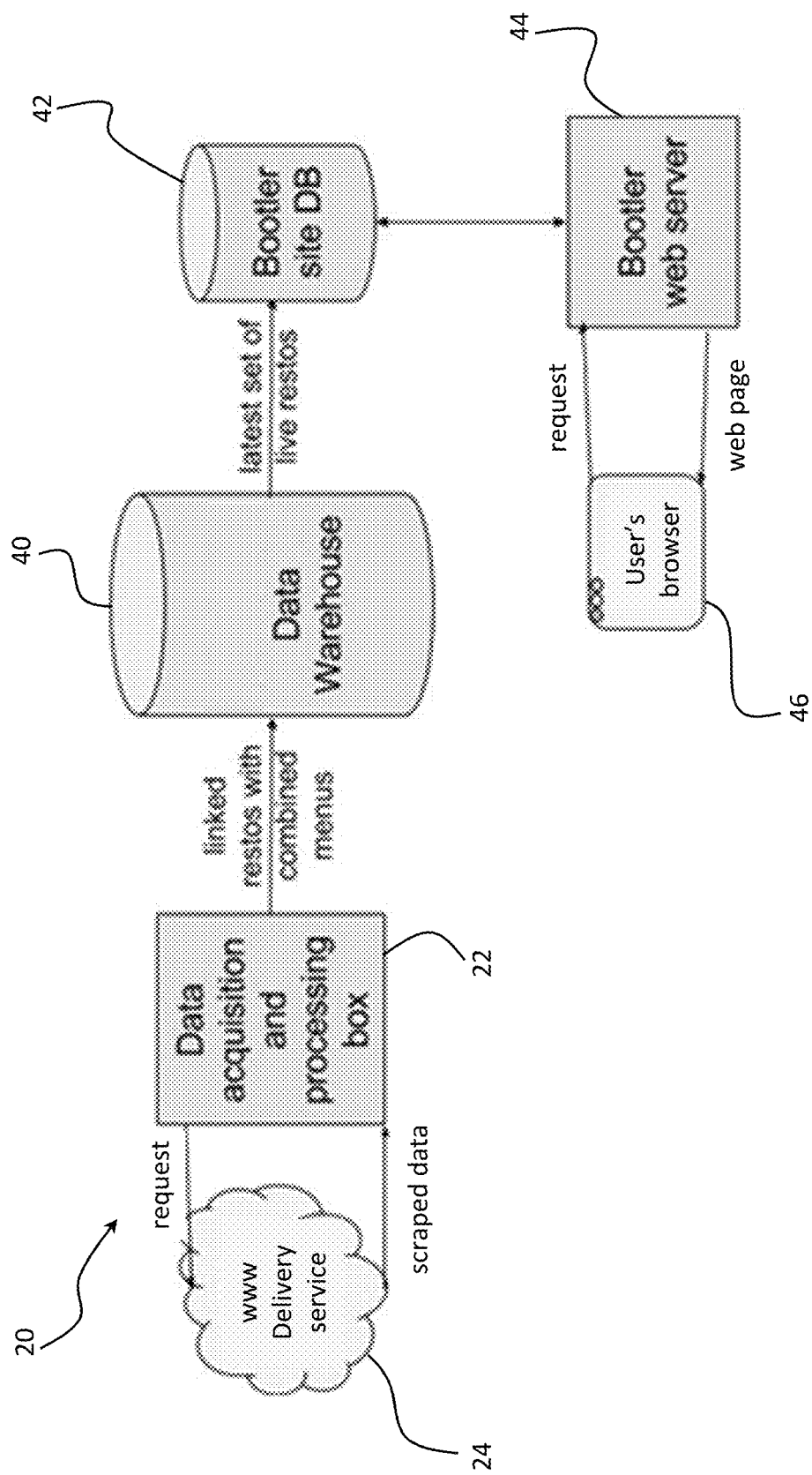
FIG. 1 shows an example communication network according to an example data consolidation method.

The present inventors have recognized that a growing number of food and/or beverage delivery services are available online, but these delivery services do not all offer delivery from the same restaurants. If a consumer chooses to only search a particular delivery service, the consumer will be limited to only the restaurant options provided by that delivery service. Further, as different delivery services may charge widely varying prices for their items (for instance, due to different business model approaches, scaling, agreements with restaurants, etc.), there can be large discrepancies in how much a given order may cost the consumer to have the same menu items from the same restaurant delivered through different delivery services. There is currently no convenient way for a user, such as a customer, to search and compare aggregated restaurants and some or all of their menu items from multiple service sources. One reason for this is that the data from different delivery services is typically provided in different respective formats, as such data was not created or stored with the goal of compatibility. Additionally, there are variations in the menu items offered between services, and thus a customer wouldn't even necessarily be able to compare two items across services if one does not have it on their menu.

Example embodiments of the invention provide a service search engine for aggregating, processing, and presenting service data. "Service data" as used herein refers to data retrieved from a particular delivery service source that is capable of being compared with similar data from a different delivery service source. For instance, for food or beverage delivery services, example systems and methods can provide an interactive, visual environment allowing a consumer to search for delivery data across multiple delivery service sources, and then easily determine multiple (or all) restaurant and delivery services that are available from a particular location and match some search criteria, and compare food and beverage prices among multiple delivery services to obtain an optimal deal for ordering from a selected restaurant. In example embodiments, a system consolidates and processes service data from various service providers, queries and processes this consolidated service data in response to user requests in real time, and visually presents the processed data for comparison by a user in an interactive environment. For example, the processed data from various service providers may be presented on a webpage or application screen such that it is lined up, e.g., side-by-side.

Example computer-implemented methods are provided for providing a searchable aggregated data structure for a networked application. In an example method, source data is acquired from a plurality of delivery service computers associated with a plurality of food or beverage delivery services over a communication network, the acquired source data being in a plurality of formats, where the acquired source data includes, for each of the plurality of food or beverage delivery services, data representing multiple source menu items provided by multiple restaurants. The acquired source data is mapped according to a predetermined data format to provide formatted data. The formatted data is linked to common restaurants based on restaurant identifier data such that at least one food or beverage delivery service is linked to each common restaurant and its source menu items. Common menu items among the source menu items are identified in the formatted data, and, for each identified common menu item, the source menu items are associated with a master menu item. The linked data and the master menu items are combined into a master data set, and the master data set and the restaurant identifier data are imported into the searchable aggregated data structure.

By providing a searchable aggregated data structure, including by acquiring source data in multiple formats, mapping the source data, linking the source data, associating common menu items with master menu item, and providing the master data set, example methods address problems unique to computer networks by transforming data from disparate data sources that would otherwise not be linked to one another and that are stored in varying formats into a master data structure stored on a networked database. The searchable aggregated data structure can then be accessed, e.g., over a network, associated with additional information, such as real-time location data and user requests, and queried in real time to provide an interactive comparison between the transformed data.

In example methods, in combination with any of the above features, acquiring data includes employing an application programming interface (API) to interact with the plurality of delivery service computers.

In example methods, in combination with any of the above features, acquiring data includes scraping data from the plurality of delivery service computers.

In example methods, in combination with any of the above features, scraping includes extracting raw data objects from webpage data from the delivery service computers.

In example methods, in combination with any of the above features, mapping the acquired data includes aliasing fields of the acquired data from formats used by the delivery service computers to respective fields of the predetermined data format.

In example methods, in combination with any of the above features, the restaurant identifier data include one or more of restaurant name data, restaurant location data, or restaurant identification code.

In example methods, in combination with any of the above features, linking includes analyzing the restaurant identifier data to determine the common restaurants and linking the formatted data associated with like common restaurants to a master restaurant data object.

In example methods, in combination with any of the above features, identifying includes training an algorithm to identify sets of identical menu items from the menu items across different delivery services, wherein the identified menu items include menu items having same or different spellings or descriptions.

In example methods, in combination with any of the above features, associating includes, for each set of identical menu items, creating a master menu item that contains references to the identified identical menu items in that set.

In example methods, in combination with any of the above features, training an algorithm uses the multiple source menu items and/or previously collected menu data.

In example methods, in combination with any of the above features, training an algorithm trains one or more word frequency models.

In example methods, in combination with any of the above features, training one or more word frequency models includes labeling pairs of items matched using word frequency techniques.

In example methods, in combination with any of the above features, associating includes processing the source menu items against the one or more word frequency models.

In example methods, in combination with any of the above features, the method further includes associating master restaurant data objects with grid points within a city to which the restaurants can deliver. In example methods, in combination with any of the above features, the method further includes indexing restaurant tag descriptors that may be searched by a user.

Example systems provide an interactive food ordering service accessible by a user computing device. Example systems include a data acquisition and processing module configured to acquire source data from a plurality of delivery service computers associated with a plurality of food delivery services and provide a master data set of formatted data, wherein the master data set includes, for each of the plurality of food delivery services, data representing multiple menu items provided by multiple restaurants; and a website database configured for receiving the most recent data from the master data set, the master data set representing the multiple menu items provided by the plurality of food delivery services for the multiple restaurants.

In example systems, in combination with any of the above features, the data acquisition and processing module includes an extraction module configured to extract the source data from the plurality of delivery service computers as raw files, a mapping module configured to convert the raw files to a standardized format to provide formatted data, a linking module configured to perform record linkage on the formatted data according to identification data that identifies the multiple restaurants, and a menu combining module configured to combine multiple source menus from linked restaurants into the master data set.

In example systems, in combination with any of the above features, the website database includes the master data set in a searchable format.

In example systems, in combination with any of the above features, the system further includes a data warehouse configured to store the provided master data set in a searchable format, wherein the data warehouse is accessible by the website database to receive data.

Example apparatuses providing a searchable aggregated data structure for a networked application include a processor, a memory accessible by the processor, and a set of computer-readable instructions stored on a non-transitory medium and accessible by the processor. The instructions are executable by the processor to perform a method including acquiring source data from a plurality of delivery service computers associated with a plurality of food or beverage delivery services over a communication network, where the acquired source data is in a plurality of formats, and where the acquired source data includes, for each of the plurality of food or beverage delivery services, data representing multiple source menu items provided by multiple restaurants. The method further includes mapping the acquired source data according to a predetermined data format to provide formatted data, linking the formatted data to common restaurants based on restaurant identifier data such that at least one food or beverage delivery service is linked to each common restaurant and its source menu items, identifying common menu items among the source menu items in the formatted data, and, for each identified common menu item, associating the source menu items with a master menu item, combining the linked data and the master menu items into a master data set, and importing the master data set and the restaurant identifier data into the searchable aggregated data structure.

An example apparatus, in combination with any of the above features, further includes a storage device in communication with the processor for storing the searchable aggregated data structure.

An example apparatus, in combination with any of the above features, further includes a network interface for communicating with the plurality of delivery source computers.

Example computer-implemented search methods are also provided for a plurality of food or beverage delivery services. In an example method, a location of a user communication device connected over a network is determined. A search request from the user communication device is received via an interactive application. A database is queried based on the determined location and the received search request, where the database stores data representing a plurality of menu items provided by a plurality of food or beverage delivery services for a plurality of restaurants, and where the database includes data associated with the plurality of restaurants. It is determined whether at least one restaurant within a predetermined range of the determined location is associated with the received search request, and, if so, a set of one or more restaurants associated with the received search request is determined, wherein each restaurant in the set is linked to one or more food or beverage delivery services among the plurality of food or beverage delivery services. Data representing each of the one or more food or beverage delivery services is combined onto a rendered page of the interactive application, wherein the combined data can be viewed on the page simultaneously. A selection of at least one menu item is received. For each of the plurality of food or beverage delivery services, an estimated cost for delivering the selected at least one menu item to the determined location is determined. The determined estimated cost for each of the plurality of food or beverage delivery services is visually associated with the respective food or beverage delivery service on the rendered page. The rendered page is transmitted to the user communication device.

The computer-implemented search methods disclosed herein provide a real-time, interactive method for allowing a user to visually compare information among delivery sources that otherwise are not linked. Such search methods further solve the technical problem of acquiring, transforming, and visually communicating location-specific information from multiple sources to a user via a network, and allowing the user to interact with such information in real time via an interactive application.

In example methods, in combination with any of the above features, determining a location includes one or more of receiving a location input or automatically determining the location.

In example methods, in combination with any of the above features, the database includes a data set of master restaurant data objects and formatted source data, the source data being acquired from a plurality of delivery service computers and formatted.

In example methods, in combination with any of the above features, the formatted data is linked based on common restaurants.

In example methods, in combination with any of the above features, the received search request includes a food or beverage category.

In example methods, in combination with any of the above features, the method further includes storing the received selection in an online shopping cart.

In example methods, in combination with any of the above features, combining data representing the one or more delivery services includes providing a plurality of drop-down menus in the rendered page, where each of the drop-down menus represent and visually indicate one of the one or more delivery services, where each of the plurality of drop-down menus displays the estimated cost for the represented delivery service.

In example methods, in combination with any of the above features, each of the drop-down menus further displays a price subtotal, an estimated tax, an estimated delivery fee, and an estimated delivery time to the determined location for the represented delivery service.

In example methods, in combination with any of the above features, the plurality of drop-down menus are displayed within a frame of the rendered page, where the frame further comprises a viewable cart including the selected at least one menu item.

In example methods, in combination with any of the above features, if one or more of the selected menu items is not deliverable by one of the plurality of delivery services, the method further includes updating the rendered page to visually indicate a disabling of the one of the plurality of delivery services.

In example methods, in combination with any of the above features, the method further includes receiving a selection of one of the plurality of delivery services, and directing the user communication device to a delivery service computer associated with the selected delivery service.

In example methods, in combination with any of the above features, the method further includes receiving an additional search request from the user communication device. In example methods, in combination with any of the above features, the method further includes querying the database based on the determined location, where the database represents a plurality of beverages provided by at least one additional beverage delivery service. In example methods, in combination with any of the above features, the method further includes determining a plurality of beverages that are deliverable by the additional beverage delivery service within the predetermined range of the determined location.

In example methods, in combination with any of the above features, the method further includes displaying the plurality of beverages on the rendered page to provide an updated page, receiving a selection of at least one of the plurality of beverages, determining an estimated cost for delivering the received selection of at least one of the plurality of beverages to the determined location, and displaying the determined estimated cost on the updated page.

In example methods, in combination with any of the above features, the method further includes storing the received selection in an online shopping cart, and storing the received selection of at least one of the plurality of beverages in an additional online shopping cart.

In example methods, in combination with any of the above features, combining data representing the one or more delivery services includes providing a plurality of drop-down menus in the updated page, where each of the drop-down menus representing and visually indicating one of the one or more additional beverage delivery services, where each of the plurality of drop-down menus displays the estimated cost for the represented additional beverage delivery service.

In example methods, in combination with any of the above features, displaying the determined estimated cost includes displaying an additional drop-down menu for the beverage delivery service, where the additional drop-down menu visually indicates the determined estimated cost.

Example systems provide an interactive food or beverage ordering service accessible by a user computing device. Example systems include a data acquisition and processing module configured to acquire source data from a plurality of delivery service computers associated with a plurality of food or beverage delivery services and provide a master data set of formatted data, where the master data set includes, for each of the plurality of food or beverage delivery services, data representing multiple menu items provided by multiple restaurants; a website database configured for receiving the most recent data from the master data set, the master data set representing the multiple menu items provided by the plurality of food or beverage delivery services for the multiple restaurants; and a website server.

The website server is configured to determine a location of the user computing device connected over a network, receive a search request from the user computing device via an interactive application; query the website database based on the determined location and the received search request; determine whether at least one restaurant within a predetermined range of the determined location that is associated with the received search request, and, if so, determining a set of one or more restaurants associated with the received search request, where each restaurant in the set is linked to one or more food or beverage delivery services among the plurality of food or beverage delivery services; combine data representing each of the one or more food or beverage delivery services onto a rendered page of the interactive application, where the combined data can be viewed on the page simultaneously, receive a selection of at least one menu item; determine, for each of the plurality of food delivery services, an estimated cost for delivering the selected at least one menu item to the determined location; visually associate the determined estimated cost for each of the plurality of food delivery services with the respective food delivery service on the rendered page; and transmit the rendered page to the user computer.

In example systems, in combination with any of the above features, the system further includes a storage device configured to store the provided master data set in a searchable format, where the storage device is accessible by the website database to receive data.

In example systems, in combination with any of the above features, the data acquisition and processing module includes an extraction module configured to extract the source data from the plurality of delivery service computers as raw files. In example systems, in combination with any of the above features, the data acquisition and processing module includes a mapping module configured to convert the raw files to a standardized format to provide formatted data. In example systems, in combination with any of the above features, the data acquisition and processing module includes a linking module configured to perform record linkage on the formatted data according to identification data that identifies the multiple restaurants. In example systems, in combination with any of the above features, the data acquisition and processing module includes a menu combining module configured to combine multiple source menus from linked restaurants into the master data set.

In example systems, in combination with any of the above features, the search request includes a food or beverage category.

Example apparatuses providing a searchable aggregated data structure for a networked application include a processor, a memory accessible by the processor, and a set of computer-readable instructions stored on a non-transitory medium and accessible by the processor. The instructions are executable by the processor to perform a method including determining a location of a user communication device connected over a network; receiving a search request from the user communication device via an interactive application; querying a database based on the determined location and the received search request, where the database stores data representing a plurality of menu items provided by a plurality of food or beverage delivery services for a plurality of restaurants, where the database includes data associated with the plurality of restaurants; determining whether at least one restaurant within a predetermined range of the determined location is associated with the received search request, and, if so, determining a set of one or more restaurants associated with the received search request, where each restaurant in the set is linked to one or more food or beverage delivery services among the plurality of food or beverage delivery services; combining data representing each of the one or more food or beverage delivery services onto a rendered page of the interactive application, wherein the combined data can be viewed on the page simultaneously; receiving a selection of at least one menu item; determining, for each of the plurality of food or beverage delivery services, an estimated cost for delivering the selected at least one menu item to the determined location; visually associating the determined estimated cost for each of the plurality of food or beverage delivery services with the respective food or beverage delivery service on the rendered page; and transmitting the rendered page to the user communication device.

In example apparatuses, in combination with any of the above features, the apparatus further includes a network interface for communicating with the user communication device.

Preferred embodiments will now be discussed with respect to the drawings. The drawings include schematic figures that may not be to scale, which will be fully understood by skilled artisans with reference to the accompanying description. Features may be exaggerated for purposes of illustration. From the preferred embodiments, artisans will recognize additional features and broader aspects of the invention.

FIG. 1 shows an example communication network (network 20) according to an example data consolidation method for aggregating, transforming, and visually presenting data for services from various sources to a user for comparison. The network 20 may be one network, or a combination of networks, including parts of an Ethernet, LAN, WAN, WiFi or WiMax network, wireless network, optical network, cellular network, global network, internet, Public Switch Telephone Network (PSTN), fiber optic network, etc.

A data acquisition and processing module 22 communicates via the network 20 with a plurality of delivery service computers 24, each of which store data used for performing a delivery service. The data acquisition and processing module 22 is in communication with a data warehouse 40 for storing consolidated data. The data warehouse 40 in turn is in communication with a website database 42, which is linked to a website server 44. The website server 44 interacts with a user communication device 46, such as via a device operating a user's web browser or application.

One example service that may be used with example systems and methods is a food or beverage delivery service for delivering food menu items and beverages, and particular illustrative examples herein are directed to food and beverage delivery services. It will be appreciated that reference to food menu items and food delivery services herein are applicable to beverage items and beverage delivery services, and vice versa. However, it will also be appreciated that analogous methods and systems can be applied to aggregating, processing, and presenting data for other services.

The plurality of delivery service computers 24 can store data for any of various service sources, such as individual delivery services for delivering food or beverages from restaurants in a food or beverage service example. Such delivery service computers 24 may include website server computers for the service sources and/or computer databases for the service sources. A particular delivery service computer 24 may be associated with one or more service sources, and particular service sources may be associated with one or more delivery service computers 24. In other words, the stored data for the plurality of service sources may be distributed among a plurality of computers in any suitable manner. Further, the stored data may be in various file formats.

To obtain food and beverage menu item data and delivery data, the data acquisition and processing module 22 communicates with the plurality of delivery service computers 24 using any suitable communication method to request data from the plurality of delivery service computers and receive data over the network 20. For example, the data acquisition and processing module 22 can request (pull) restaurant and menu data from a plurality of delivery service computers 24 associated with food delivery services, e.g., by scraping (harvesting or extracting) the requested data from websites or by interfacing with the delivery service computer via an application programming interface (API). Such information may be stored in a database as a database data structure. For example, the data acquisition and processing module 22 may acquire data by accessing the data through the API from a food delivery computer server that is in one type of data structure and transform such information into a database structure when storing in the database. As another example, the data acquisition and processing module may acquire the data by scraping the requested data from website data in one format (e.g., raw hypertext markup language (HTML), extensible markup language (XML), or Javascript Object Notation (JSON) objects) that the delivery service computer 24 uses to render the webpage and transforming this information into a database structure.

The data acquisition and processing module 22 receives the acquired (e.g., scraped or accessed) data for processing. Data acquisition preferably is performed automatically. Processing may be performed periodically (e.g., every day, every week, every month, etc.), in response to one or a plurality of service data updates (e.g., when a particular restaurant makes a significant menu change), and/or in real time in response to a customer request. If the data acquisition is via an API, real time updates may be more convenient. Further, data acquisition and processing may be performed by the data acquisition and processing module 22 on an initial basis and then updated (e.g., supplemented, replaced, etc.), and/or new information may entirely replace previously acquired data.

Figure 2:
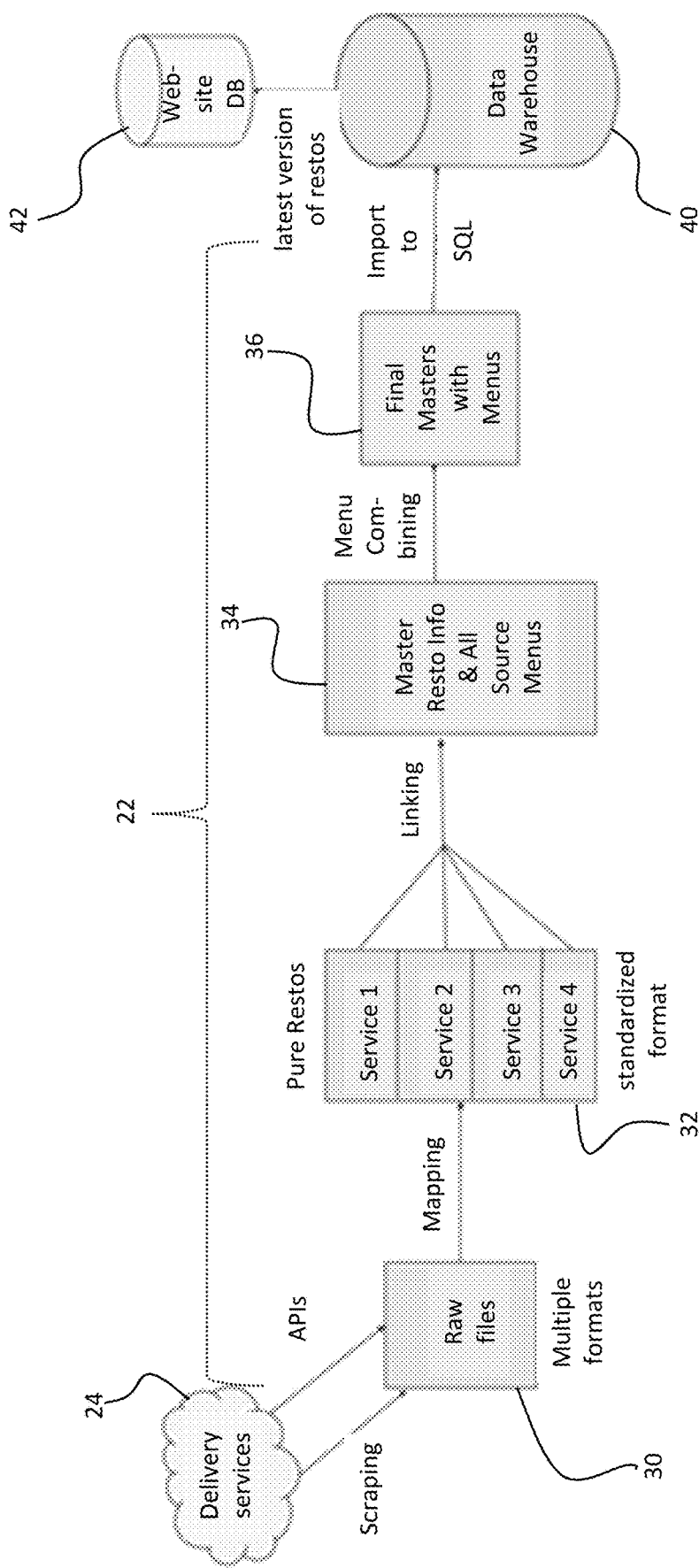
FIG. 2 illustrates an example data acquisition, processing, and consolidation method according to an embodiment of the invention.

FIG. 2 illustrates an example processing method performed by the data acquisition and processing module 22, which can be embodied in one or more computers. An extraction module 30 of the data acquisition and processing module 22 extracts raw files including source data for multiple delivery services from the delivery service computers 24 associated with the multiple delivery services, such as via APIs if offered by the delivery services or by scraping website data from the delivery service computers as described above.

The received raw files may be in multiple source formats, such as but not limited to database formats used by the API or object formats used to render webpages. A mapping module 32 of the data acquisition and processing module 22 transforms the received raw files by converting the raw files from its particular source format to a standardized format. In an example embodiment, this transformation is performed by, for a particular source data item, aliasing one field from the delivery services computer's format to a respective field in the standardized format. For example, the standardized format may include standard fields for each of a plurality of food or beverage delivery services (Services 1-4 in FIG. 2).

As a non-limiting example, suppose for a restaurant "Pisa Pizzeria" that delivery service "Service 1" has a database object representing the restaurant that contains the fields { . . . 'delivery_fee': 5.00, 'delivery_fee_is_taxable': true . . . } and delivery service "Service 2" has an object with the field { . . . 'delivery_percentage': 5 . . . }. These fields may be mapped by the mapping module 32 to a standardized format as: { . . . 'delivery_fee': {'as_percentage': false, 'flat': 500, 'taxable': true} . . . } for Service 1; and { . . . 'delivery_fee': {'as_percentage': true, 'percent': 5, 'taxable': false} . . . } for Service 2.

A linking module 34 of the data acquisition and processing module 22 performs record linkage on the mapped source data from the mapping module 32 according to identification data (restaurant identification data) that identifies common restaurants in various ways, such as, but not limited to, restaurant name, geocoordinates, street address, etc. This record linkage identifies a unique restaurant, referred to herein as a master restaurant, (shown as "pure restos" in FIG. 2) that may be common across multiple delivery services based on the identification data, and links the mapped source data to data associated with that master restaurant. In an example embodiment, the linking module 34 iterates through the restaurant identification data for un-linked source restaurants, e.g., one at a time (though it is also contemplated that data could be processed collectively). The linking module 34 attempts to find an existing master restaurant data object (e.g., a data object uniquely identifying a master restaurant, which data object in some example methods is associated with or represents one or more items of the restaurant identification data above) to link the current source to, considering each master restaurant within a geographical area near the source restaurant. For example, if a considered master restaurant has a similar name and an identical street address to the current source restaurant, the source is linked to the master restaurant. If no master restaurant data object is available to link to the source restaurant based on its restaurant identification data, a new master restaurant data object can be created and then linked to that source restaurant. The new master restaurant is then available to link to un-linked source restaurant in future iterations of the example method.

Determining whether a particular unlinked source restaurant should be linked to an existing master restaurant data object (or to a newly created master restaurant data object) can be based on various metrics. Example metrics include, but are not limited to, variable-weight similarity metrics derived by comparing restaurant identification data. Using variable-weight similarity metrics allows linking of two records from different sources whose names are not identical but are found to be similar enough because their identical addresses lend weight to the possibility of linking them. In an example method, no other source restaurant from that same food or delivery source will attempt linking to that master restaurant, but for different sources the same criteria being met will result in that food or delivery source's source restaurant becoming linked to the same master restaurant data object. As a result, the linking module 34 provides linked master restaurants that have multiple delivery source menus (source menus).

For example, FIG. 3 shows a sample database table showing consolidated service data. The consolidated service data from the linking module 34 provides master restaurant-level information for multiple delivery sources. Fields include a general identifier for the delivery service ("data_source"), a restaurant identification code that is as an internal identifier for the delivery service computer 24 ("source resto_id"), an identifier used for the restaurant in the website database 42 ("bootler_id"), restaurant name ("name"), restaurant-related tags ("tags"), price_rating, order_minimum, sales_tax, and delivery_fee. Other fields may be provided as well, and these are merely examples. Data not provided by a particular delivery source computer 24 for a particular field can be represented by null items. Numerical data may be standardized using the standardized format. For example, for a sales tax of 10.5%, the "sales_tax" field may include data represented by "10.5" as shown in FIG. 3, whereas it may be represented by "0.105" in other standards.

Referring again to FIG. 2, a menu combining module 36 of the data acquisition and processing module 22 combines the multiple source menus from the linked restaurants into a single master menu. This is done by, for example, training an algorithm using the multiple source menus and/or previously collected menu data to recognize identical items across source menus using word frequency models including but not limited to term frequency-inverse document frequency (TF-IDF). Next, the menu combining module 36 processes the multiple source menu items against the model using the trained algorithm to associate (e.g., match or link) the source menu item with the recognized identical items. Normalization of item names preferably happens during processing to ensure a more uniform comparison, for example by singularizing all nouns or by removing superfluous item numbers that particular services may use in their source item names Using manual training of a support vector machine, accomplished by labeling pairs of items matched using the simpler word frequency techniques, a machine learning-based algorithm can match even menu items that have very different names, spellings, or descriptions from source to source.

In an example method, the trained algorithm identifies sets of identical items among the multiple source menu items. For each set of identical items that is identified, all items in the set are linked (e.g., related) to a combined master menu item that is created. Item details for that master menu item are determined from some combination of the linked source item details. For example, the master item name could be the name of one of the linked source menu items in the set, a modification of such a name, or could be generated or obtained in some other way. In an example method, the master menu item description is chosen from its linked source items' descriptions by finding the most semantically-dense description. This is repeated for all sets of identified identical items to provide a group of master menu items. Individual menu items from a given source that were not identified as being identical to any other source's menu item can also be linked to a created master menu item as the sole linked item, though this is not required in all embodiments. As a result, the menu combining module 36 provides master menu information, where each menu item can reference multiple source menu items.

For example, FIG. 4 shows a sample database table showing source menu items alongside a combined master menu item. Fields include the unique identifier for the delivery service ("data_source"), an identifier for the master menu item used in the website database 42 ("master_item_id"), an identifier used internally at the delivery service computer 24 ("source_item_id"), the name of the item and the section in which it appears in the source menus or in an example master menu ("item_name", "section_name"), and the price charged for that item by the respective delivery service ("item_price"). Further, for the master menu items, there is an array of ids, "source_item_ids", where the ids of the source items that combine to make one master item are stored, with the index of an entry corresponding to the data source number of the service that uses that id to identify the item in their menus. There is also an array of prices, "item_prices", where the index of a price entry corresponds to the data_source number of the service that charges that price for their version of that menu item.

The combination of linked master restaurants with their corresponding combined master menus provides a golden master consolidated data set, which can be imported into a data warehouse 40 using methods such as executing a series of structured query language (SQL) "INSERT" commands, or exporting as a comma-separated values (CSV) file and sending that to the data warehouse. The data warehouse 40 includes the latest version of the restaurant information and all previous versions. Imported data is tagged for later searching by users by geographical location. A grid of points spanning a city's area is generated, and each master restaurant data object is determined to fall either inside of or outside of a given point's delivery range. This determination is made based on the delivery ranges of the services whose restaurant information comprises the set of source restaurant data for that particular master restaurant. At the time of import, preferably, the full set of tags or cuisine descriptors used for each master restaurant are indexed. This indexing allows for the user to search for terms such as "pizza" and find all restaurants associated with that label.

Thus, example processing methods provide a golden master consolidated data set including sets of source restaurants that are each linked to one master restaurant data object, and their combined menus. This allows the food or beverage delivery services that deliver from a given restaurant to a particular location to be known. The golden master consolidated data set provides a combined menu for each restaurant that contains the union of all items available through each of its applicable food services.

Referring again to FIGS. 1-2, the consolidated data from the data acquisition and processing module 22, e.g., from the menu combining module 36, is transmitted to the data warehouse 40, which is in communication with the data acquisition and processing module. The data warehouse 40, in an example embodiment, is a structured query language (SQL) database, a particular example of which is a data warehouse. Using a SQL database here can provide more efficient querying over all menu items.

The consolidated data in the data warehouse 40 is sent to a web site database 42, e.g., a NoSQL database, in communication with the data warehouse. Using a NoSQL database in an example embodiment allows the website to receive objects that are structured in the way that is expected for rendering pages for the user, though other types of databases may be provided. Data representing the latest version of all restaurants to be shown on the website are exported into the website database 42 from the data warehouse 40. The website database 42 is in communication with a user-facing website server 44 (FIG. 1), which interfaces with a user's communication device 46, such as via a web browser, application (app), etc. Example user interfacing includes receiving data requests from the user and sending data for a web page including the requested data.

Figure 5:
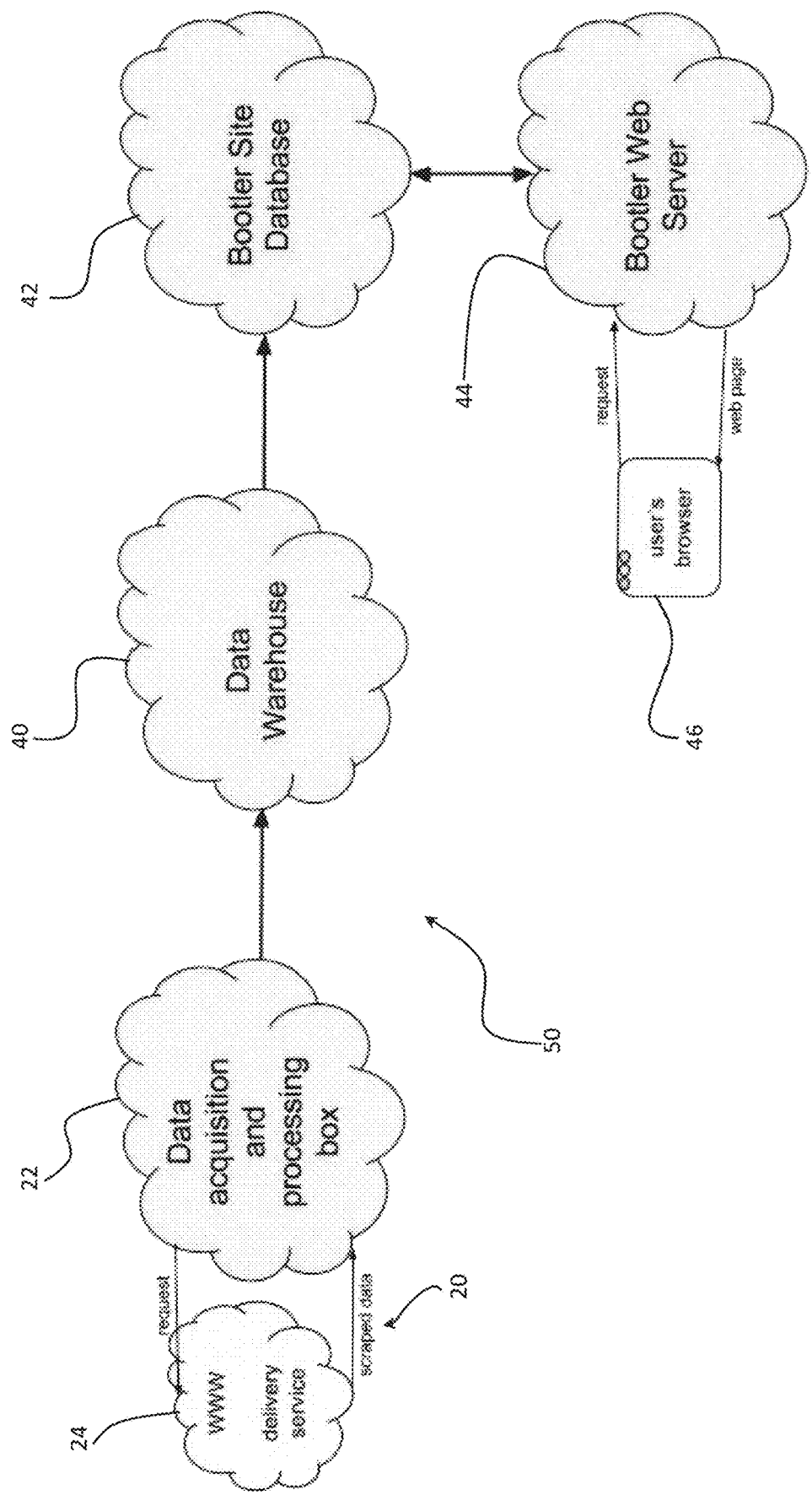
FIG. 5 shows hardware components embodied in cloud components for an example system for consolidating restaurant and beverage delivery service data according to an embodiment of the invention.

FIG. 5 shows an example system 50 for consolidating restaurant and beverage delivery service data and making the consolidated data searchable by users. The system can be embodied in one or more processing devices, such as computers, which as shown in FIG. 5 are hosted on respective services in the cloud. The system 50 includes the data acquisition and processing module 22, which interfaces with the delivery service computers 24 via the network 20. The data warehouse 40 is in communication with the data acquisition and processing module 22. The website database 42 is in communication with the data warehouse, and the website server 44 or other front-end server is in communication with the website database. The website server 44 interacts with the user's communication device 46, e.g., by receiving requests for food or beverage delivery information and rendering webpages including the requested food or beverage delivery information. The website server 44 and the website database 42 provide a service search engine for providing information to and transactions with users for food and beverage delivery services.

Figure 6A:
FIGS. 6A-6C show an example process performed by a service search engine according to an embodiment of the invention.
Figure 6B:
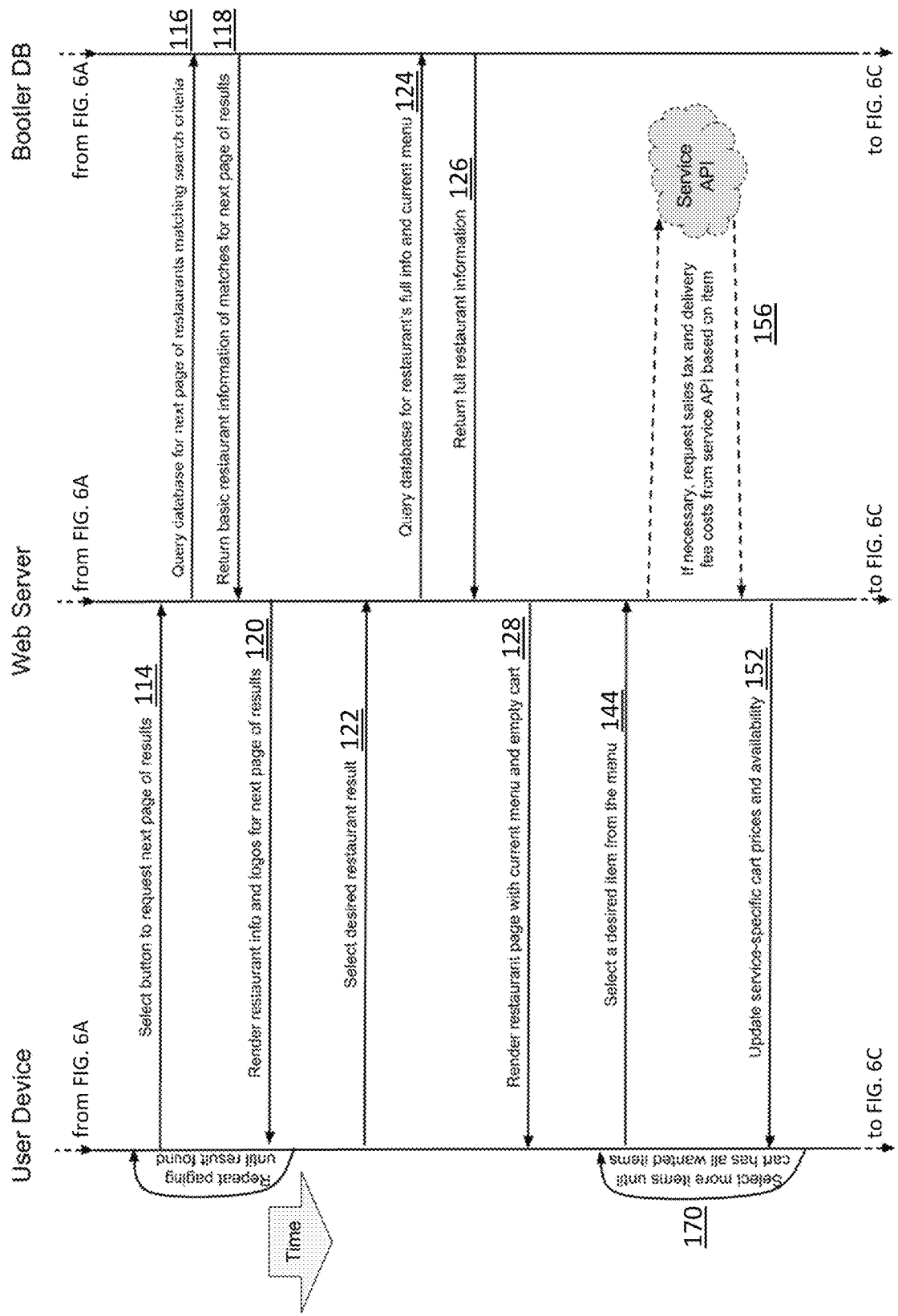
Figure 6C:
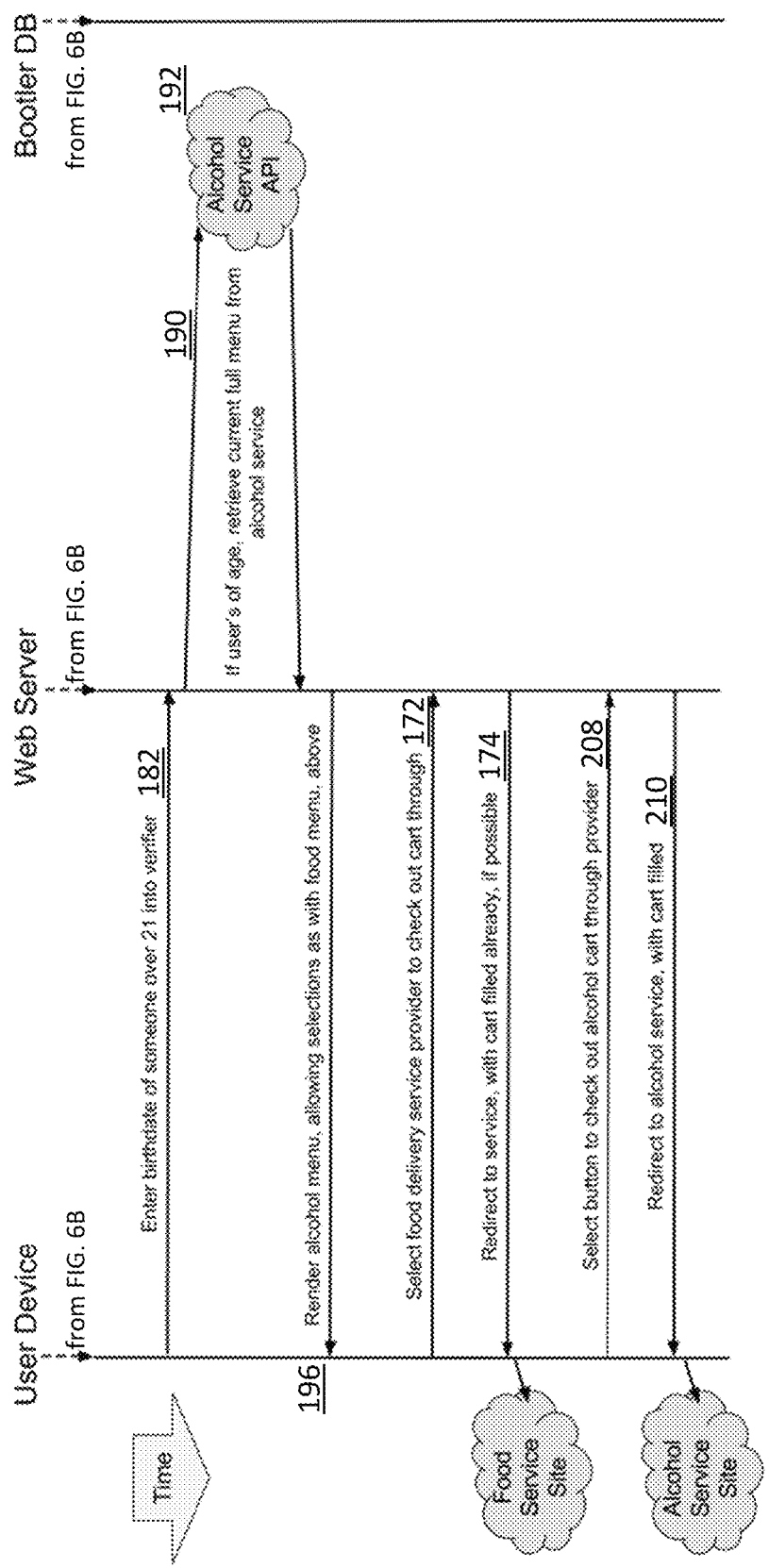

FIGS. 6A-6C show an example process performed by the service search engine, e.g., by the website server 44 and the website database 42, interacting with the user communication device 46. FIGS. 7-14 show example screenshots for a service search engine website, as provided by the website server 44 showing an example user interaction. Alternatively, the website database 42 and the website server 44 can interact with a web application, or standalone application (app) provided and/or installed on the user communication device 46. It will be appreciated that description herein relating to a website is similarly applicable to a web application or standalone application and vice versa. The user interacts with the service search engine via any suitable computing device, e.g., through a web browser, mobile browser, separate installed application, etc. The example service search engine in FIGS. 7-14 is for a food and/or beverage delivery service.

Figure 7:
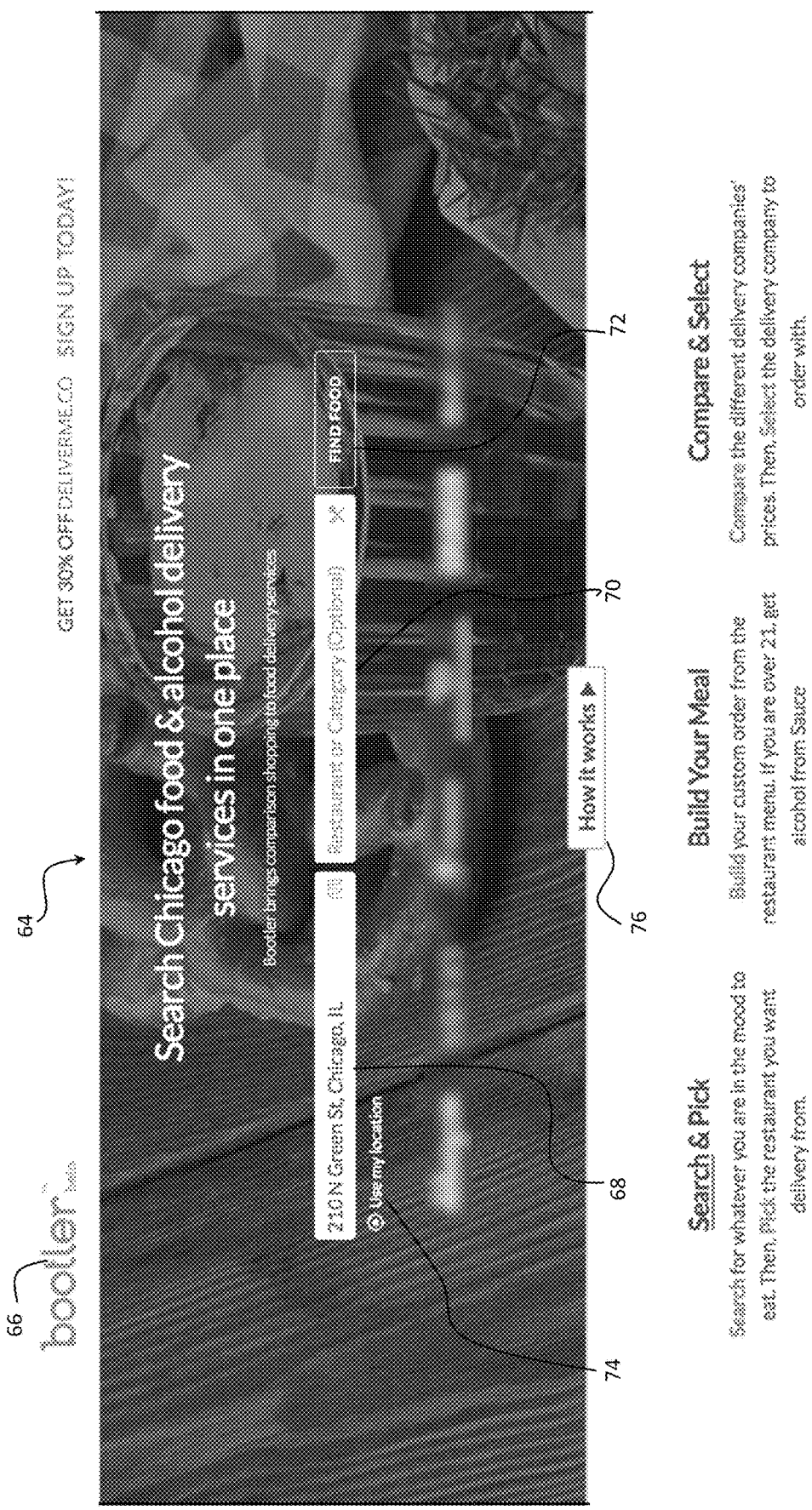
FIG. 7 shows an example screenshot of a home page for the service search engine according to an embodiment of the invention.

The website server 44 is accessed by the user communication device 46 (step 60) via an interactive application. For example, the user may access a URL linked to the website server 44 through a browser, may activate a specific application that connects with the website server, or in other ways. The website server 44 renders a home page including search fields (step 62). FIG. 7 depicts an example service search engine home page 64, from which a user can make a search request, such as by beginning or continuing a search of service providers, and eventually place an order. The home page 64 includes a title 66, a location form field 68 for entering a location, a restaurant/category form field 70 for entering a restaurant or food category to refine the search further, and a selectable (e.g., clickable) icon 72 for submitting a request. A widget ("Use my location") 74 is also provided for automatically determining and entering a user's device's location, e.g., based on internet protocol (IP) address or geolocation received from the user's computing device 46. An additional icon 76 is provided to offer assistance with using the website or app.

To make a search request, at the home page 64, the user can begin a food (and/or alcohol) delivery search experience by either clicking the "Use my location" widget 74 to automatically enter a street address in the location form field 68, or by manually entering all or part of this information into the location form field, e.g., by typing a partial address (step 78). The user also can optionally enter either a restaurant's name or enter a food category in the restaurant/category form field 70, or parts thereof to make the search request. These and/or other search requests are received by the website server via network communication with the user computing device using methods that will be appreciated by those of ordinary skill in the art. The location form field 68 communicates with the website server 44 constantly so that when a user types a partial address (step 78), the website server 44 displays a list of selectable valid addresses matching the partial address (step 80). If part of a food category or restaurant is entered (step 82), the website server 44 displays a list of selectable valid search terms or restaurant names (step 84).

Figure 8:
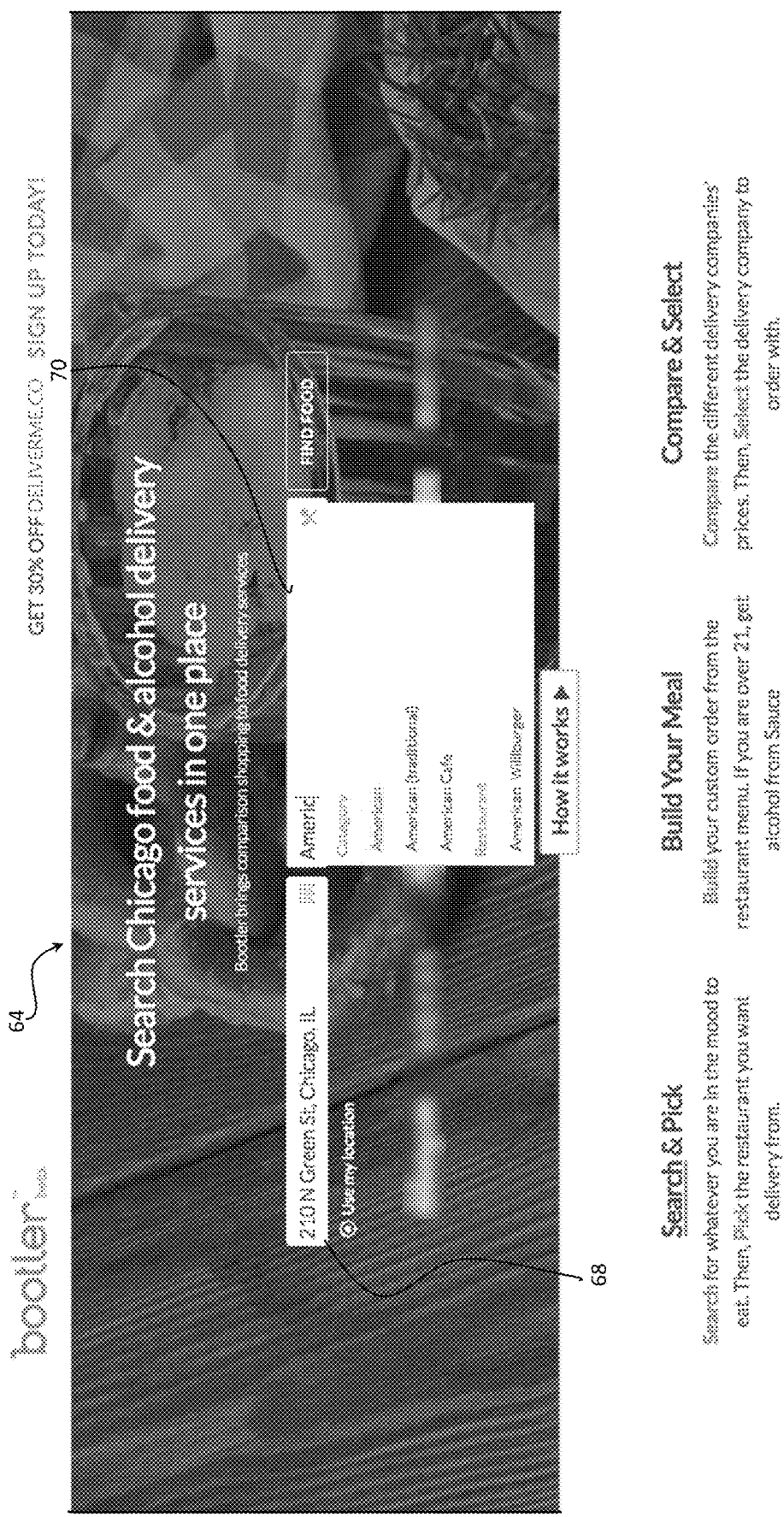
FIG. 8 shows an example screenshot of an instance of the home page of FIG. 7 when a user is performing a search.

For example, FIG. 8 shows an instance of the search engine home page 64 in which the location "210 North Green Street, Chicago, Ill." is indicated in the location form field 68, and the partial word "Americ" is indicated as the food category search term in the restaurant/category form field 70. In response to the determined location and partially or fully entered food category search term, the website server 44 queries the website database 42 using the determined food category and location (e.g., address) search criteria, and retrieves data from the website database including proposed categories and restaurant names within a particular distance of the determined location (e.g., 0-5 miles, though this can be larger, and can be selectable by a user in some embodiments) that relate to the food category partial search term "Americ". In a particular embodiment, for a plurality of restaurants, each restaurant's availability from different locations is tagged so that it can be determined which are potentially available from a proposed address. The results are displayed in an example embodiment in a drop-down format under the restaurant/category form field 70 as suggestions for consideration by the user.

The website server 44 then receives a request from the user to begin a search (step 88). For example, the user may click the "Find Food" icon 72 to submit the request to the website server 44 to find a list of results matching the user's desired search criteria. In the example shown in FIG. 8, the user selects a category, e.g., "American," among the suggested search terms in the drop-down box under the restaurant/category form field 70, and clicks the "Find Food" icon 72 to submit the request to the website server. The website server 44 receives the request, and in response queries the website database 42 for delivery services that deliver to an area including the determined location, using the selected category ("American") as a search filter. For instance, the website server and/or the website database 42 can perform processing that determines which groups of restaurants can be ordered through at least one of the delivery services for the determined location. This search relies on the earlier restaurant data processing that is preferably performed at import time as disclosed elsewhere herein, in which the geographic points that each restaurant is available from are determined.

The website database 42 returns basic restaurant information for matches for a first page of results (step 90). The website server 44 retrieves the matching restaurant results that are available through one or more delivery services (step 91), and creates a webpage rendering restaurant information and logos associated with the delivery services as individual locations (e.g., frames or result cards) within the webpage (step 92).

Figure 9:
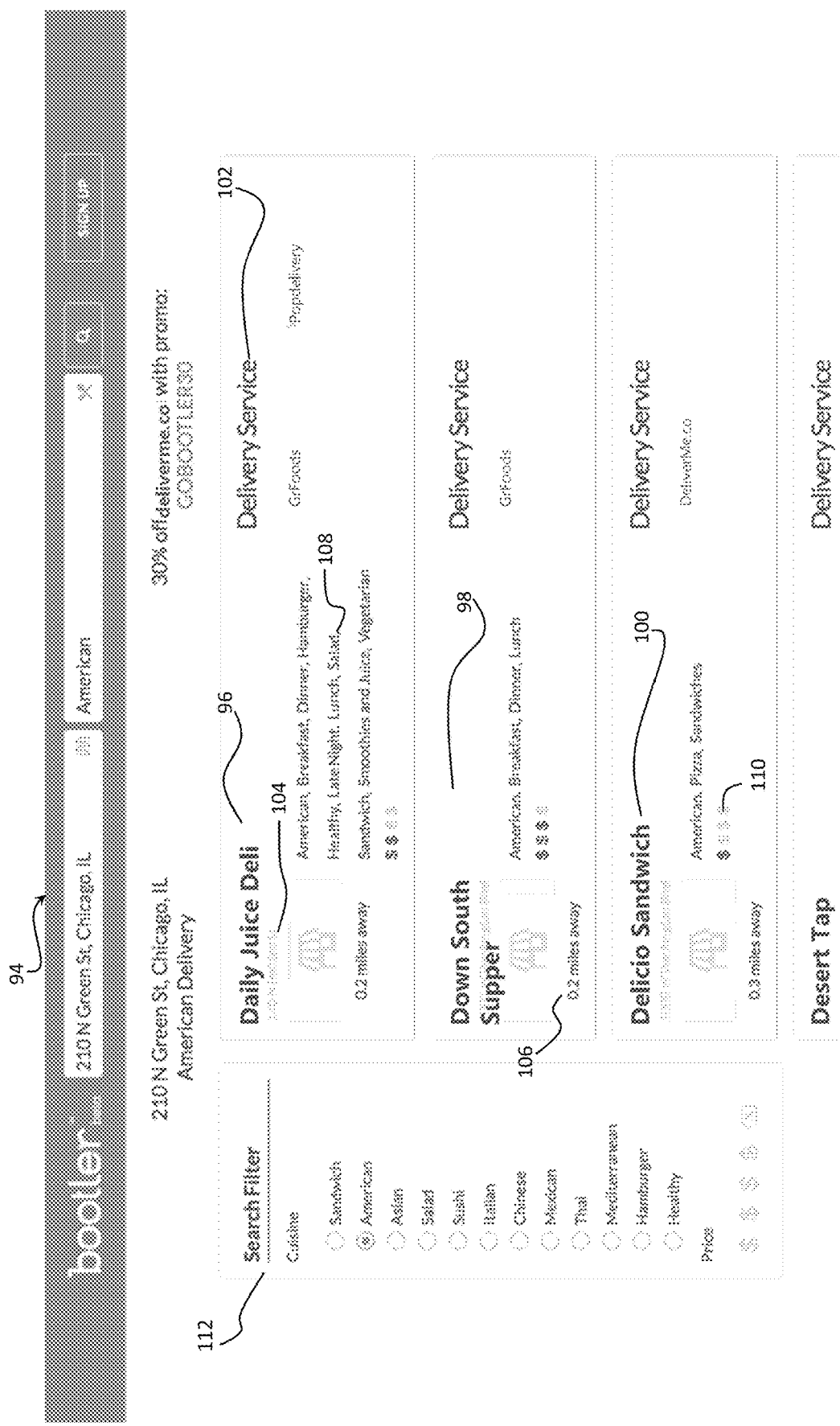
FIG. 9 shows an example screenshot of a search results page showing restaurants near a user for a selected food category.

FIG. 9 shows an example result page 94 as presented by the website server 44. Preferably, suggested restaurants 96, 98, and 100, for which information and logos are rendered, are displayed in order from nearest to farthest from the determined location (for example, the user's home or business address), though other orders for displayed restaurants could be used, such as least expensive to most expensive restaurants, most to least variety of food selections, best-reviewed to worst-reviewed restaurants, etc. The displayed results present to the user which delivery services 102 are available for that restaurant, as well as the restaurant address 104, distance from the determined (e.g., user) location 106, food categories 108, and price point 110 (e.g., from 1-4 dollar signs ($), where $$$$ is the most expensive). The provided result webpage 94 preferably also includes a search filter frame 112 for adjusting the search filter in real time, e.g., by selecting from among radio selections for food categories, by additionally filtering by price, etc. In response to the updated search filters, the adjusted search results are displayed in an updated webpage.

If the user selects a next page of results (step 114), e.g., by selecting a button on the result page 94 to request the next page of results, the website server 44 queries the website database 42 for the next page of results matching the search criteria (step 116). For example, the next page of results may include the next farthest away restaurants, the next most expensive restaurants, etc. The website database 42 then returns basic restaurant information of matches for the next page of results (step 118), and the website server 44 renders restaurant information and logos for the next page of results (step 120). If the user again requests a next page of results (step 114), steps 116, 118, and 120 are repeated until a result is found by the user, e.g., by the user selecting a desired restaurant result (step 122).

Each of the individual restaurants displayed on the result page 94 is preferably selectable by the user. In response to a user restaurant selection (step 122), a new webpage is created and displayed. Particularly, the website server 44 performs a query of the website's database 42 for a restaurant's full information and current menu (step 124) based on the user's established location, the selected restaurant, and the time of day, and it retrieves full restaurant information results (step 126) including, for example, available menu items, menu categories, and available delivery services for that restaurant at that time of the day. The website server 44 then creates a webpage displaying the results, including rendering a restaurant menu page with the current menu (step 128).

Figure 10:
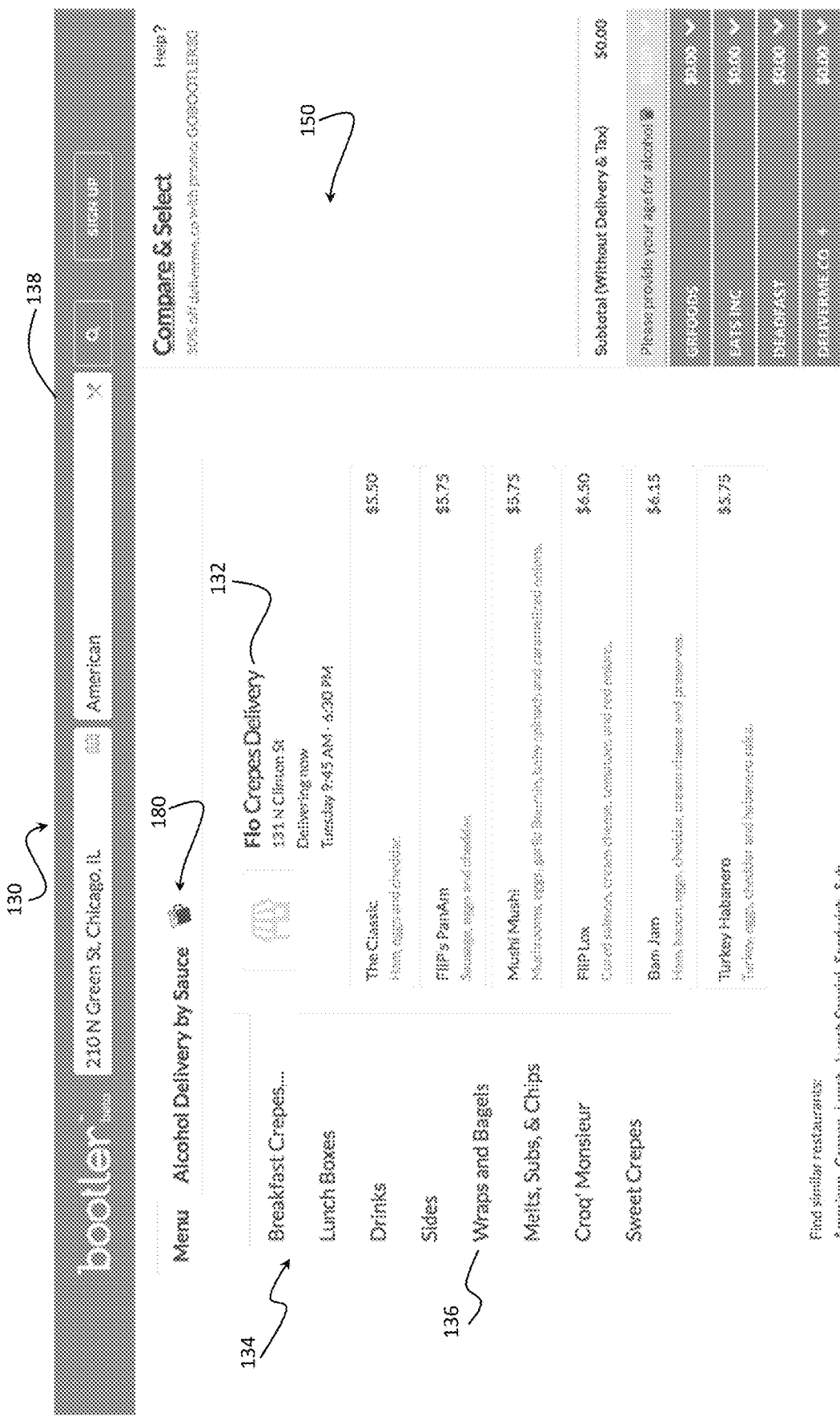
FIG. 10 shows an example screenshot of a menu page corresponding to a selected restaurant.

For example, FIG. 10 shows a restaurant menu page 130 corresponding to a selected restaurant, e.g., "Flo Crepes Delivery," which is identified by name and icon 132. A master menu frame 134 includes selectable menu categories 136 from the selected restaurant. The selectable categories 136 may also link to or display subcategories. An outer frame 138 includes the current search criteria via the location form field 68 and the restaurant/category form field 70 so that the search criteria can be viewed and a new search initiated if desired.

The user can navigate the selectable menu categories 136 or subcategories (not shown) to locate a desired item from the restaurant's menu. For example, in FIG. 11, the menu category "Croq' Monsieur" 140 is selected, and two available menu choices are presented in a web page, with ingredients and price, along with a restaurant indicator in a central frame. The "Croq' Madame" menu choice 142 is currently highlighted.

The user selects a desired item from the menu (step 144), e.g., "Croq' Madame," and the website server 44 receives the selection. When a user selects a menu choice, the selected menu choice is added to a price comparison frame 150 compiling user selections during the user session. The currently selected menu choices are stored by the website server and displayed (and updated) on the webpage.

The example price comparison frame shows two updated user menu selections: bottled spring water, and Croq' Madame, along with their price and a selectable option to delete the user selection. As new menu selections are received from the user, a base subtotal for the two user selections without delivery fees (and preferably, but not necessarily, without tax) is updated and displayed. Additionally, the website server 44 updates delivery service-specific cart prices and availability (step 152). For example, the website server 44 can query the website database 42 for the prices charged for the selected menu items when ordered through each of the delivery services that serve the current restaurant. The delivery services are displayed as drop-down menus 154 within the price comparison frame 150. If an item is unavailable through a service, that service's drop-down menu 154 will turn orange (or provide another distinguishable visual indicator) and the user will not be able to complete their order through that service. Each drop-down menu 154 includes a delivery service name along with a displayed total cost for delivering the currently-requested menu items through that delivery service, which can be calculated by adding the service subtotal, service tax, and the estimated delivery cost determined by querying the website's database 42 (e.g., if the delivery fee and/or tax is invariant) or the delivery service's API (step 156) (e.g., for determining the delivery fee and/or tax on the fly). A delivery time can be estimated, for instance, based on historical data specific to a particular delivery service.

The drop-down menus 154 in the price comparison frame 150 provide an interactive comparison of delivery service data that preferably is updated in real time. FIG. 12 shows the comparison frame 150 in FIG. 10 with expanded drop-down menus 154 for four possible delivery services: "GRFoods", "Eats Inc.", "Deadfast", and "DeliverMe.co". Upon clicking a drop-down arrow, each delivery service drop-down menu 154 shows: a menu subtotal price 158, which will be equal to or greater than the base subtotal, and reflects the menu item prices offered through that delivery service; the estimated tax 160; the estimated delivery fee 162; the estimated delivery time to the user location 164; and the order minimum 166. Further, a "Select" option 168 to select the particular delivery service is provided. Drop-down menus 154 can be compressed, e.g., by a user selecting "X".

The user can continue to add menu items (step 170) until the cart has all of the requested items using steps 144 and 152 (and optionally, step 156). As the user adds (or removes) menu items, the delivery service-specific cart prices and availability are updated in real time, and the updated results are presented to the user by the website server 44.

The user is thus able to determine their desired delivery service based on factors such as but not limited to price, service name, and estimated time of delivery. Further, in some example methods, if the menu item selection is updated by the user, and a previously available delivery service does not include a newly-selected menu item, that delivery service's expanded dropdown menu 154 can be automatically compressed and an explanation message shown. When a user submits (step 172) a delivery service selection through which to check out the cart, e.g., by clicking the "Select" icon 168, the website server 44 receives the selection and the chosen menu items, and redirects the user to the checkout page for that chosen service (step 174), in some implementations with all of their chosen items populated in that site's shopping cart.

Figure 13:
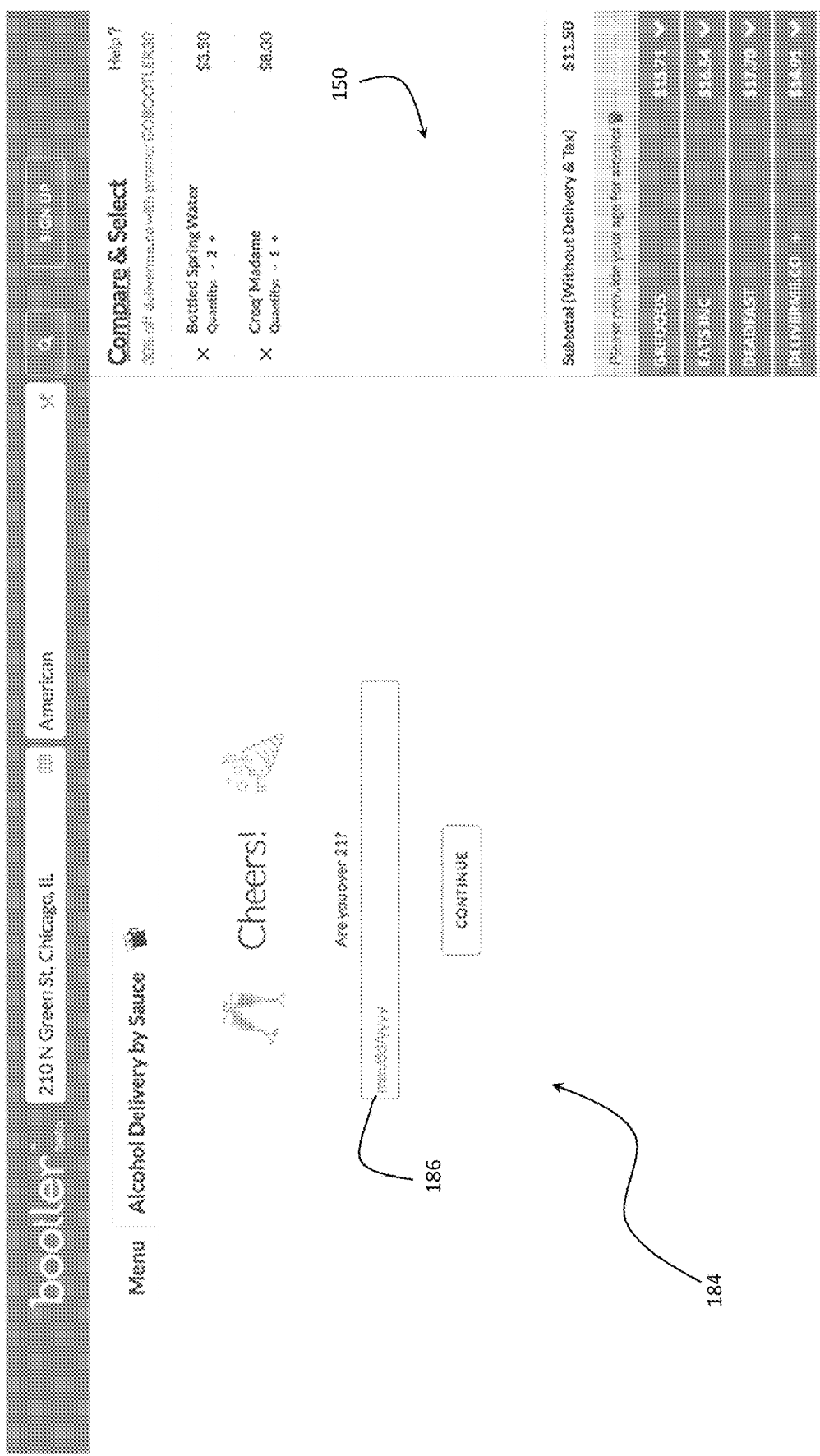
FIG. 13 shows an example screenshot of a beverage selection page.
Figure 14:
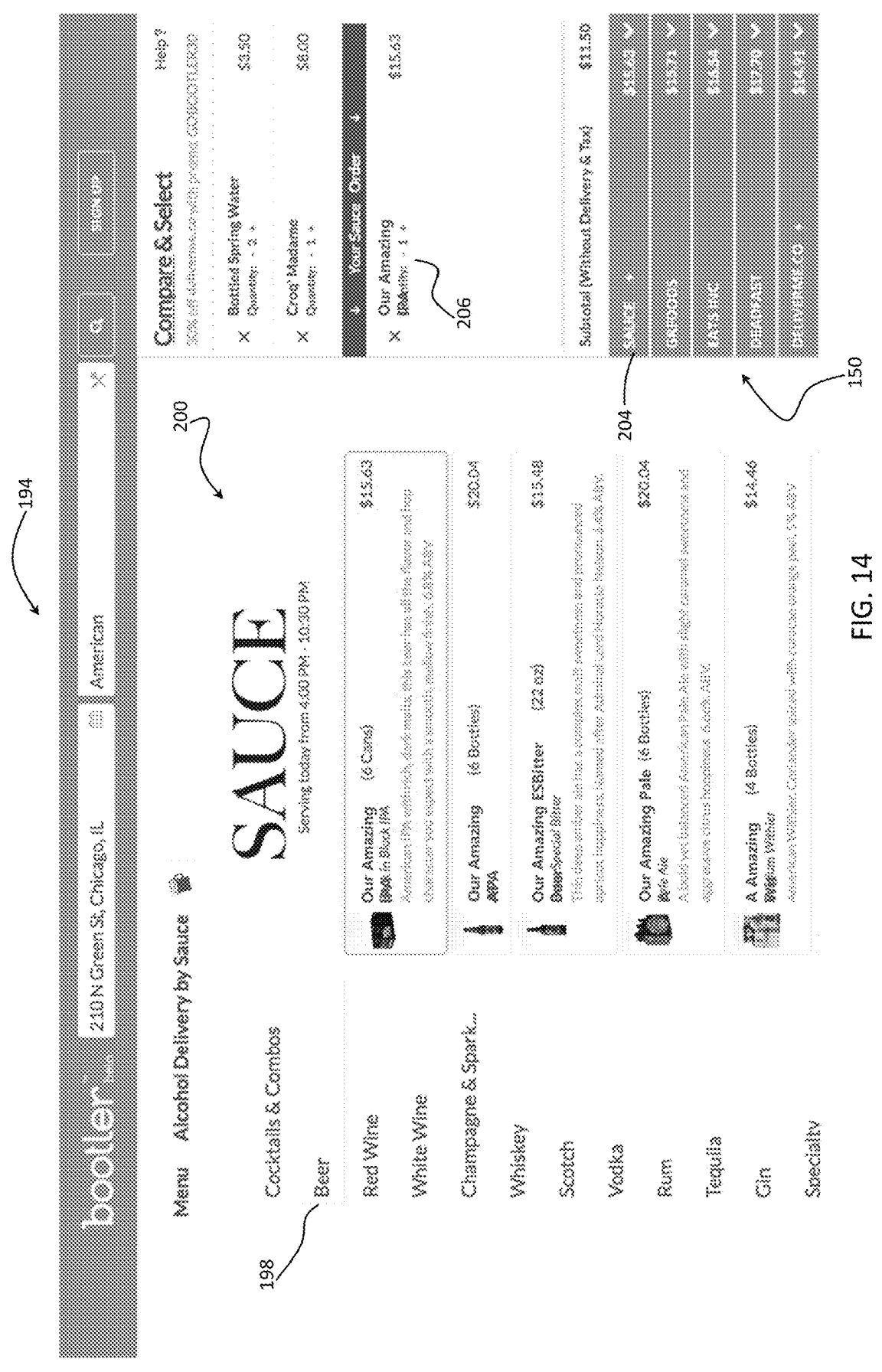

In an example embodiment, if a user also elects to order alcoholic beverages from an alcohol provider, the user may, at any stage in the process, create an alcohol order to pair with their meal order by selecting an Alcohol Delivery tab 180 (see FIG. 10) and undergoing age verification. The user submits an age verification (step 182) to verify that the user is of legal age to purchase alcohol. FIG. 13 shows an example webpage 184 including an age verification entry field 186, where a user is prompted to enter his/her birthdate in a standard format (e.g., mm/dd/yyyy) and submit the birthdate and age verification for receipt and storage in the website database 42. Upon receipt of age verification, the website server 44 retrieves a current full menu from an alcohol delivery service (step 190), for instance by interfacing with an alcohol service API (192), and then the user is taken to a new, alcohol delivery service webpage 194 (step 196), such as that shown in FIG. 14, for alcohol ordering analogous to the webpage for food item ordering in FIGS. 9-11. The alcohol delivery service webpage 194 includes a drink category frame 198 including selectable drink categories, and a central drink selection window 200 including available beverages from an alcoholic beverage delivery service. The price and delivery service comparison frame 150 is updated to include a newly-active drop-down menu 204 for the alcohol delivery service in addition to the drop-down menus 154 for the previously-available delivery service choices. User selection of the drink ("Our Amazing IPA (6 Cans)" is selected in FIG. 14) adds the drink to a separate alcohol delivery service shopping cart 206. This is checked out separately from the user's food order. After expanding the alcohol delivery tab, a tap of the Select button (step 208) will redirect the user to the alcohol service's checkout page with their shopping cart filled (step 210).

A person of ordinary skill in the art would understand that the service search engine website and application may be implemented by one or more modules described herein as well any other additional modules such that a person of ordinary skill in the art may refer to such embodiments as an application platform. Further, the modules and functions thereof may be combined or separated. In addition, such modules can be separated and portions thereof may be implemented across many devices or combined into one device.

Each of the communication interfaces may be software or hardware associated in communicating to other devices. The communication interfaces may be of different types that include a user interface, USB, Ethernet, WiFi, wireless, optical, cellular, or any other communication interface coupled to a communication network.

Persons of ordinary skill in the art will understand that embodiments of example methods may include a subset of the steps shown and described in FIGS. 1-14 as well as the order of the steps may be rearranged. Further, additional steps may be implemented by the method before, after, and in between the steps shown and described in FIGS. 1-14. In addition, the steps of example methods may be implemented by one or more modules executed by one or more computing devices as described herein.

In addition, the computing device(s) also has/have one or more communication interfaces. The computing device(s) may include one or more processors that may be co-located with each other or may be located in one module or in different parts of a computing device, or among a plurality of computing devices. The memory may include one or more storage devices that may be co-located with each other or may be located in one module, in different parts of a computing device or among a plurality of computing devices. Types of memory may include, but are not limited to, electronic memory, optical memory, and removable storage media. An intra-device communication link between processor(s), memory device(s), modules, antennas, and communication interfaces may be one of several types that include a bus or other communication mechanism.

The modules disclosed herein may be implemented by the one or more processors. Further, the modules and functions thereof may be combined or separated. In addition, such modules can be separated and portions thereof may be implemented across many devices or combined into one device.

Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein. Also, in the foregoing description, numerous details are set forth to further describe and explain one or more embodiments. These details include system configurations, block module diagrams, flowcharts (including transaction diagrams), and accompanying written description. While these details are helpful to explain one or more embodiments of the disclosure, those skilled in the art will understand that these specific details are not required in order to practice the embodiments.

As will be appreciated by one skilled in the art, aspects of the present disclosure may be embodied as an apparatus that incorporates some software components. Accordingly, some embodiments of the present disclosure, or portions thereof, may combine one or more hardware components such as microprocessors, microcontrollers, or digital sequential logic, etc., such as a processor, or processors, with one or more software components (e.g., program code, firmware, resident software, micro-code, etc.) stored in a tangible computer-readable memory device, that in combination form a specifically configured apparatus that performs the functions as described herein. These combinations that form specially-programmed devices may be generally referred to herein as modules. The software component portions of the modules may be written in any computer language and may be a portion of a monolithic code base, or may be developed in more discrete code portions such as is typical in object-oriented computer languages. In addition, the modules may be distributed across a plurality of computer platforms, servers, terminals, mobile devices, and the like. A given module may even be implemented such that the described functions are performed by separate processors and/or computing hardware platforms.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

While various embodiments of the present invention have been shown and described, it should be understood that other modifications, substitutions, and alternatives are apparent to one of ordinary skill in the art. Such modifications, substitutions, and alternatives can be made without departing from the spirit and scope of the invention, which should be determined from the appended claims.

Various features of the invention are set forth in the appended claims.

What is claimed is:

1. A computer-implemented method for providing a searchable aggregated data structure for a networked application, the method comprising:
  acquiring by a processor source data from a plurality of delivery service computers associated with a plurality of food or beverage delivery services over a communication network, the acquired source data being in a plurality of formats, where the acquired source data includes, for each of the plurality of food or beverage delivery services, data representing multiple source menu items, wherein said acquiring source data comprises one or more of:

employing an application programming interface to interface with the plurality of delivery service computers, or
scraping data from the plurality of delivery service computers;
mapping by the processor the acquired service data according to a predetermined data format to provide formatted data;
linking by the processor the formatted data to common sources of the source menu items, each of the common sources being represented by source identification data uniquely identifying a respective one of the sources, such that at least one food or beverage delivery service is linked to each common source and its source menu items;
identifying by the processor common menu items among the source menu items in the formatted data, and, for each identified common menu item, associating the source menu items with a master menu item;
combining by the processor the linked data and the master menu items into a master data set; and
importing by the processor the master data set and the source identification data into the searchable aggregated data structure.

2. The method of claim 1, wherein said scraping comprises extracting raw data objects from webpage data from the delivery service computers.

3. The method of claim 1, wherein said mapping the acquired data comprises:
aliasing fields of the acquired data from formats used by the delivery service computers to respective fields of the predetermined data format.

4. The method of claim 1, wherein the source identification data comprise one or more of name data, location data, or an identification code.

5. The method of claim 4, wherein said linking comprises:
analyzing the source identification data to determine the common sources; and
linking the formatted data associated with like common sources to a master data object.

6. The method of claim 1, wherein said identifying comprises:
training an algorithm to identify sets of identical menu items from the menu items across different delivery services, wherein the identified menu items include menu items having same or different spellings or descriptions; and
wherein said associating comprises, for each set of identical menu items, creating a master menu item that contains references to the identified identical menu items in that set.

7. The method of claim 6, wherein said training an algorithm uses at least the multiple source menu items or previously collected menu data.

8. The method of claim 7, wherein said training an algorithm trains one or more word frequency models.

9. The method of claim 8, wherein training one or more word frequency models comprises labeling sets of items matched using word frequency techniques.

10. The method of claim 8, wherein said associating comprises:
processing the source menu items against the one or more word frequency models.

11. The method of claim 1, wherein said linking comprises: analyzing the source identification data to determine the common sources;
linking the formatted data associated with like common sources to a master data object;
and associating the master data object with one or more grid points within a city.

12. A system for providing an interactive food or beverage ordering service accessible by a user computing device, the system comprising:
a data acquisition and processing module comprising a processor, memory, and computer-readable instructions stored on a non-transitory medium that are executable by the processor to acquire source data from a plurality of delivery service computers associated with a plurality of food or beverage delivery services and provide a master data set of formatted data, wherein the master data set includes, for each of the plurality of food or beverage delivery services, data representing multiple menu items linked to identification data uniquely identifying sources of the menu items delivered by the plurality of food or beverage delivery services; and
a website database accessible to the processor and configured to receive updated data from the master data set, the master data set representing the multiple menu items provided by one or more of the plurality of food or beverage delivery services;
wherein the data acquisition and processing module further comprises a plurality of modules in the form of a computer-readable instructions stored on a non-transitory medium that are executable by the processor including:
an application programming interface configured to interface the data acquisition and processing module with the plurality of delivery service computers
an extraction module configured to extract the source data from the plurality of delivery service computers as raw files by scraping data from one or more of the plurality of delivery service computers;
a mapping module configured to convert the raw files to a standardized format to provide formatted data;
a linking module configured to perform record linkage on the formatted data according to the identification data that uniquely identifies sources; and
a menu combining module configured to combine multiple source menus from linked sources into the master data set.

13. The system of claim 12, wherein the website database comprises the master data set in a searchable format.

14. The system of claim 12, further comprising:
a data warehouse configured to store the provided master data set in a searchable format;
wherein the data warehouse is accessible by the website database to receive data.

15. An apparatus for providing a searchable aggregated data structure for a networked application, the apparatus comprising:
a processor;
a memory accessible by the processor; and
a set of computer-readable instructions stored on a non-transitory medium accessible by the processor, the instructions being executable by the processor to perform a method comprising:
acquiring source data from a plurality of delivery service computers associated with a plurality of food or beverage delivery services over a communication network, the acquired source data being in a plurality of formats, where the acquired source data includes, for each of the plurality of food or beverage delivery services, data representing multiple source menu items, and wherein said acquiring source data comprises one or more of:

employing an application programming interface to interface with the plurality of delivery service computers, or scraping data from the plurality of delivery service computers;

mapping the acquired source data according to a predetermined data format to provide formatted data;

linking the formatted data to common sources of the source menu items represented by source identification data such that at least one food or beverage delivery service is linked to each common source and its source menu items;

identifying common menu items among the source menu items in the formatted data, and, for each identified common menu item, associating the source menu items with a master menu item;

combining the linked data and the master menu items into a master data set; and importing the master data set and the source identification data into the searchable aggregated data structure.

16. The apparatus of claim 15, further comprising:

a storage device in communication with the processor for storing the searchable aggregated data structure in a database accessible to the processor.

17. The apparatus of claim 15, further comprising:

a network interface for communicating with the plurality of delivery source computers.

* * * * *

UNITED STATES PATENT AND TRADEMARK OFFICE
CERTIFICATE OF CORRECTION

| | |
|---|---|
| PATENT NO. | : 11,037,090 B2 |
| APPLICATION NO. | : 16/565034 |
| DATED | : June 15, 2021 |
| INVENTOR(S) | : Michael DiBenedetto and Liam Hession |

It is certified that error appears in the above-identified patent and that said Letters Patent is hereby corrected as shown below:

In the Claims

Claim 12, Column 22, Line 31: the phrase "with the plurality of delivery service computers" should read "with the plurality of delivery service computers, or"

Signed and Sealed this
Twenty-third Day of April, 2024

Katherine Kelly Vidal
*Director of the United States Patent and Trademark Office*